United States Patent
An et al.

(10) Patent No.: US 12,137,070 B2
(45) Date of Patent: Nov. 5, 2024

(54) ELECTRONIC DEVICE AND METHOD FOR EXCHANGING A MESSAGE INCLUDING MEDIA CONTENT

(71) Applicant: SAMSUNG ELECTRONICS CO., LTD., Suwon-si (KR)

(72) Inventors: Jibin An, Suwon-si (KR); Dongki Kwon, Suwon-si (KR); Hongseok Kwon, Suwon-si (KR); Hyunil Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/188,461

(22) Filed: Mar. 23, 2023

(65) Prior Publication Data
US 2023/0421514 A1 Dec. 28, 2023

Related U.S. Application Data

(63) Continuation of application No. PCT/KR2023/003669, filed on Mar. 20, 2023.

(30) Foreign Application Priority Data

Jun. 28, 2022 (KR) .................. 10-2022-0078822
Aug. 3, 2022 (KR) .................. 10-2022-0096992

(51) Int. Cl.
*H04L 51/04* (2022.01)
*G06F 3/04845* (2022.01)
(Continued)

(52) U.S. Cl.
CPC .......... *H04L 51/04* (2013.01); *G06F 3/04845* (2013.01); *H04L 51/063* (2013.01); *H04L 51/10* (2013.01)

(58) Field of Classification Search
CPC ....... H04L 51/04; H04L 51/063; H04L 51/10; G06F 3/04845
(Continued)

(56) References Cited

U.S. PATENT DOCUMENTS 10,447,390 B2  10/2019  Oshima et al.
10,503,362 B2  12/2019  Guo
(Continued)

FOREIGN PATENT DOCUMENTS

JP  2011253488 A  12/2011
JP  5030054 B2  7/2012
(Continued)

*Primary Examiner* — Wing F Chan
*Assistant Examiner* — Leon Y Tseng
(74) *Attorney, Agent, or Firm* — CANTOR COLBURN LLP

(57) ABSTRACT

An electronic device includes a communication circuit, a display, and a processor. The processor transmits the media contents to the external electronic device using the communication circuit. The processor displays a plurality of visual objects in the display that respectively represents the media contents. Before transmitting the first media content to the external electronic device, the processor displays a first visual object representing the first media content within a first state in which a visual aspect is adjusted. After the first media content is transmitted to the external electronic device, the processor changes the state of the first visual object to a second state different from the first state.

20 Claims, 13 Drawing Sheets

(51) Int. Cl.
    *H04L 51/063*    (2022.01)
    *H04L 51/10*    (2022.01)

(58) Field of Classification Search
    USPC .......................................................... 709/206
    See application file for complete search history.

(56) References Cited

U.S. PATENT DOCUMENTS

| | | |
|---|---|---|
| 10,540,066 B2 * | 1/2020 | Kim ........................ H04L 51/58 |
| 10,587,566 B2 | 3/2020 | Kim et al. |
| 10,972,414 B2 | 4/2021 | Ryu et al. |
| 11,184,302 B2 | 11/2021 | Choi et al. |
| 11,226,735 B2 | 1/2022 | Kwon et al. |
| 2007/0202898 A1 | 8/2007 | Bae et al. |
| 2016/0253083 A1 * | 9/2016 | Lee ................... H04M 1/27475 |
| | | 715/771 |
| 2017/0038922 A1 | 2/2017 | Eim et al. |
| 2019/0037173 A1 * | 1/2019 | Lee ..................... G06F 3/04842 |
| 2021/0157459 A1 * | 5/2021 | Cohee ................. G06F 3/04817 |

FOREIGN PATENT DOCUMENTS

| | | |
|---|---|---|
| JP | 6394199 B2 | 9/2018 |
| JP | 6792154 B2 | 11/2020 |
| JP | 2021176237 A1 | 11/2021 |
| KR | 100679683 B1 | 1/2007 |
| KR | 20170016165 A | 2/2017 |
| KR | 101952048 B1 | 2/2019 |
| KR | 102350954 B1 | 1/2022 |
| KR | 102553886 B1 | 7/2023 |

* cited by examiner

ELECTRONIC DEVICE AND METHOD FOR EXCHANGING A MESSAGE INCLUDING MEDIA CONTENT

CROSS-REFERENCE TO RELATED APPLICATION(S)

This application is a continuation of PCT International Application No. PCT/KR2023/003669, which was filed on Mar. 20, 2023, and claims priority to Korean Patent Application No. 10-2022-0078822, filed on Jun. 28, 2022, and claims priority to Korean Patent Application No. 10-2022-0096992, filed on Aug. 3, 2022, in the Korean Intellectual Property Office, the disclosures of which are incorporated by reference herein in their entirety.

BACKGROUND

Technical Field

The following description relates to an electronic device and a method for exchanging a message including media content.

Description of Related Art

A short message service (SMS) is a service for exchanging text between electronic devices connected by a network. A length of text exchanged in the network by SMS may be limited by a requirement of SMS. In response to a request from network subscribers, a service (e.g., long message service (LMS)) for exchanging text having a length exceeding the upper limit limited by the requirements has been developed. As integrated in functions within electronic devices increase, a service for exchanging a video and/or an image as well as text among electronic devices are being developed.

SUMMARY

An electronic device according to an embodiment may include a communication circuit, a display, and a processor. The processor may be configured to receive, in a user interface for transmitting a message that is displayed in the display, a user input indicating transmitting a plurality of media contents including a first media content to an external electronic device. The processor may be configured to transmit, in response to the user input, the plurality of media contents to the external electronic device by using the communication circuit. The processor may be configured to display a plurality of visual objects respectively representing the plurality of media contents. The processor may be configured to display, before transmitting the first media content to the external electronic device, a first visual object among the plurality of visual objects representing the first media content in a first state where a visual aspect of the first visual object is adjusted. The processor may be configured to change, after transmitting the first media content to the external electronic device, a state of the first visual object from the first state to a second state different from the first state.

According to an embodiment, a non-transitory computer-readable medium storing one or more programs, the one or more programs may be configured to, when executed by a processor of an electronic device, cause the electronic device to receive, from a first external electronic device, a plurality of media contents with information regarding a user input indicating transmitting the plurality of media contents. The one or more programs may be configured to cause the electronic device to transmit, to a second external electronic device based on receiving the plurality of media contents, a plurality of messages respectively including the information, another information indicating the number of the plurality of media contents, and the plurality of media contents.

A method of an electronic device may include receiving a first message including a first media content, from an external electronic device by using a communication circuit of the electronic device. The method of the electronic device may include displaying a visual object, based on the first message, for representing the first media content included in the first message, in a user interface associated with the first message and displayed in a display of the electronic device. The method of the electronic device may include identifying, based on receiving a second message including a second media content from the external electronic device, whether the second message includes information for displaying the second media content with the first media content. The method of the electronic device may include displaying, based on identifying the information included in the second message, the second media content with the first media content within the visual object.

According to an embodiment, a method of an electronic device may include receiving, in a user interface for transmitting a message that is displayed in the display, a user input indicating transmitting a plurality of media contents including a first media content to an external electronic device. The method of the electronic device may include transmitting, in response to the user input, the plurality of media contents to the external electronic device by using the communication circuit, and displaying a plurality of visual objects respectively represent the plurality of media contents. The method of the electronic device may include displaying, before transmitting the first media content to the external electronic device, a first visual object among the plurality of visual objects representing the first media content in a first state where a visual aspect of the first visual object is adjusted. The method of the electronic device may include changing, after transmitting the first media content to the external electronic device, a state of the first visual object from the first state to a second state different from the first state.

According to an embodiment, a method of an electronic device may include receiving, from a first external electronic device, a plurality of media contents with information regarding a user input indicating transmitting the plurality of media contents. The method of the electronic device may include transmitting, to a second external electronic device based on receiving the plurality of media contents, a plurality of messages respectively including the information, another information indicating the number of the plurality of media contents, and the plurality of media contents.

An electronic device according to an embodiment may include a communication circuit, a display, and a processor. The processor may be configured to receive a first message including a first media content, from an external electronic device by using a communication circuit of the electronic device. The processor may be configured to display a visual object, based on the first message, for representing the first media content included in the first message, in a user interface associated with the first message and displayed in a display of the electronic device. The processor may be configured to identify, based on receiving a second message including a second media content from the external electronic device, whether the second message includes information for displaying the second media content with the first media content. The processor may be configured to display, based on identifying the information included in the second message, the second media content with the first media content within the visual object.

According to an embodiment, a non-transitory computer-readable medium storing one or more programs, the one or more programs may be configured to, when executed by a processor of an electronic device, cause the electronic device to receive, in a user interface for transmitting a message that is displayed in the display, a user input indicating transmitting a plurality of media contents including a first media content to an external electronic device. The one or more programs may be configured to cause the electronic device to transmit, in response to the user input, the plurality of media contents to the external electronic device by using the communication circuit, and display a plurality of visual objects respectively represent the plurality of media contents. The one or more programs may be configured to cause the electronic device to display, before transmitting the first media content to the external electronic device, a first visual object among the plurality of visual objects representing the first media content in a first state where a visual aspect of the first visual object is adjusted. The one or more programs may be configured to cause the electronic device to change, after transmitting the first media content to the external electronic device, a state of the first visual object from the first state to a second state different from the first state.

According to an embodiment, an electronic device may include a communication circuit and a processor. The processor may be configured to receive, from a first external electronic device through the communication circuit, a plurality of media contents with information regarding a user input indicating transmitting the plurality of media contents. The processor may be configured to transmit, to a second external electronic device through the communication circuit based on receiving the plurality of media contents, a plurality of messages respectively including the information, another information indicating the number of the plurality of media contents, and the plurality of media contents.

According to an embodiment, a non-transitory computer-readable medium storing one or more programs, the one or more programs may be configured to, when executed by a processor of an electronic device, cause the electronic device to receive a first message including a first media content, from an external electronic device by using a communication circuit of the electronic device. The one or more programs may be configured to cause the electronic device to display a visual object, based on the first message, for representing the first media content included in the first message, in a user interface associated with the first message and displayed in a display of the electronic device. The one or more programs may be configured to cause the electronic device to identify, based on receiving a second message including a second media content from the external electronic device, whether the second message includes information for displaying the second media content with the first media content. The one or more programs may be configured to cause the electronic device to display, based on identifying the information included in the second message, the second media content with the first media content within the visual object.

DETAILED DESCRIPTION

Figure 1:
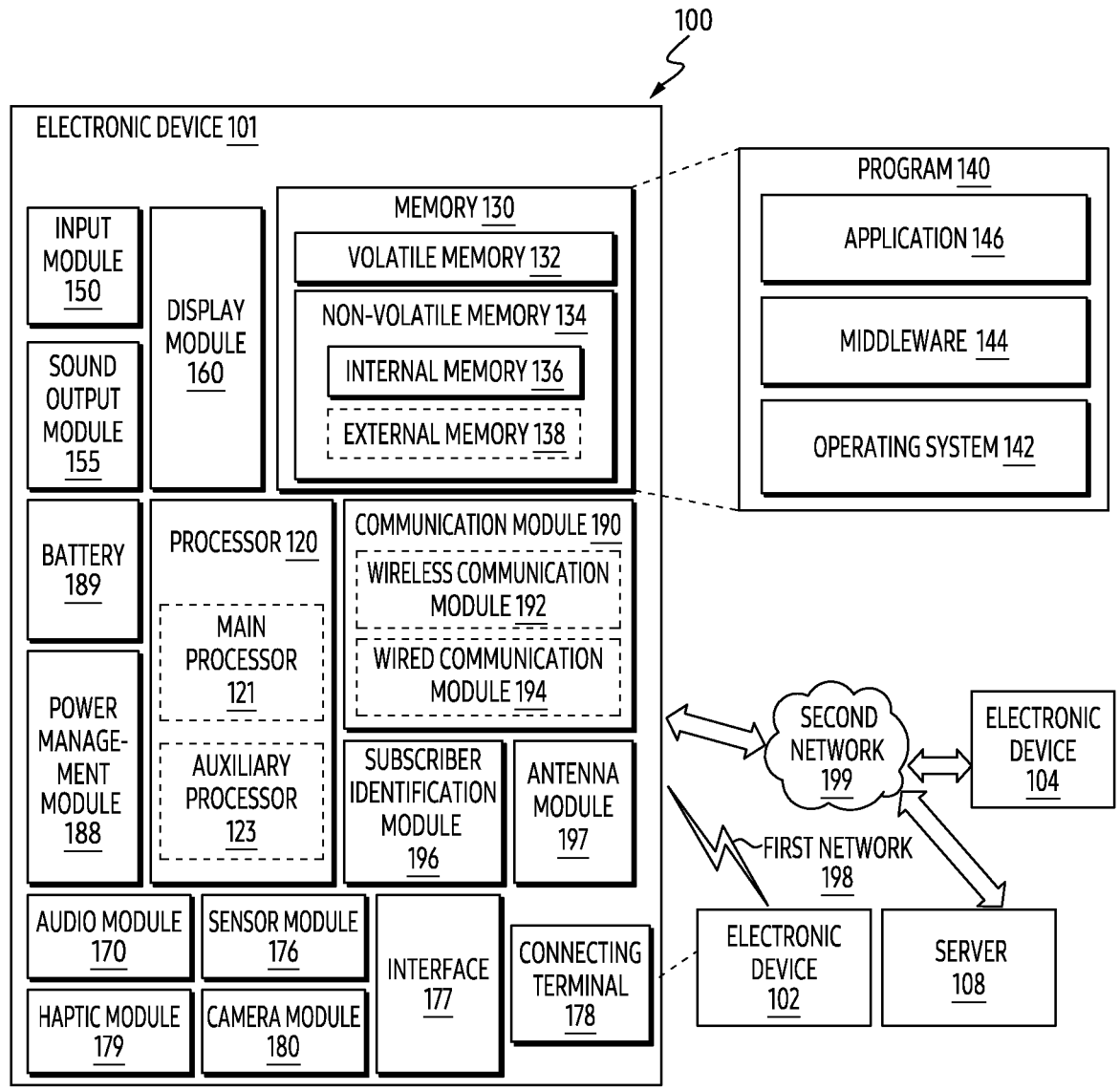
FIG. 1 is a block diagram of an electronic device in a network environment according to an embodiment.

Hereinafter, various embodiments of the present document will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, circuit, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuit to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," "circuit," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium, also referred to as a non-transitory computer-readable medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
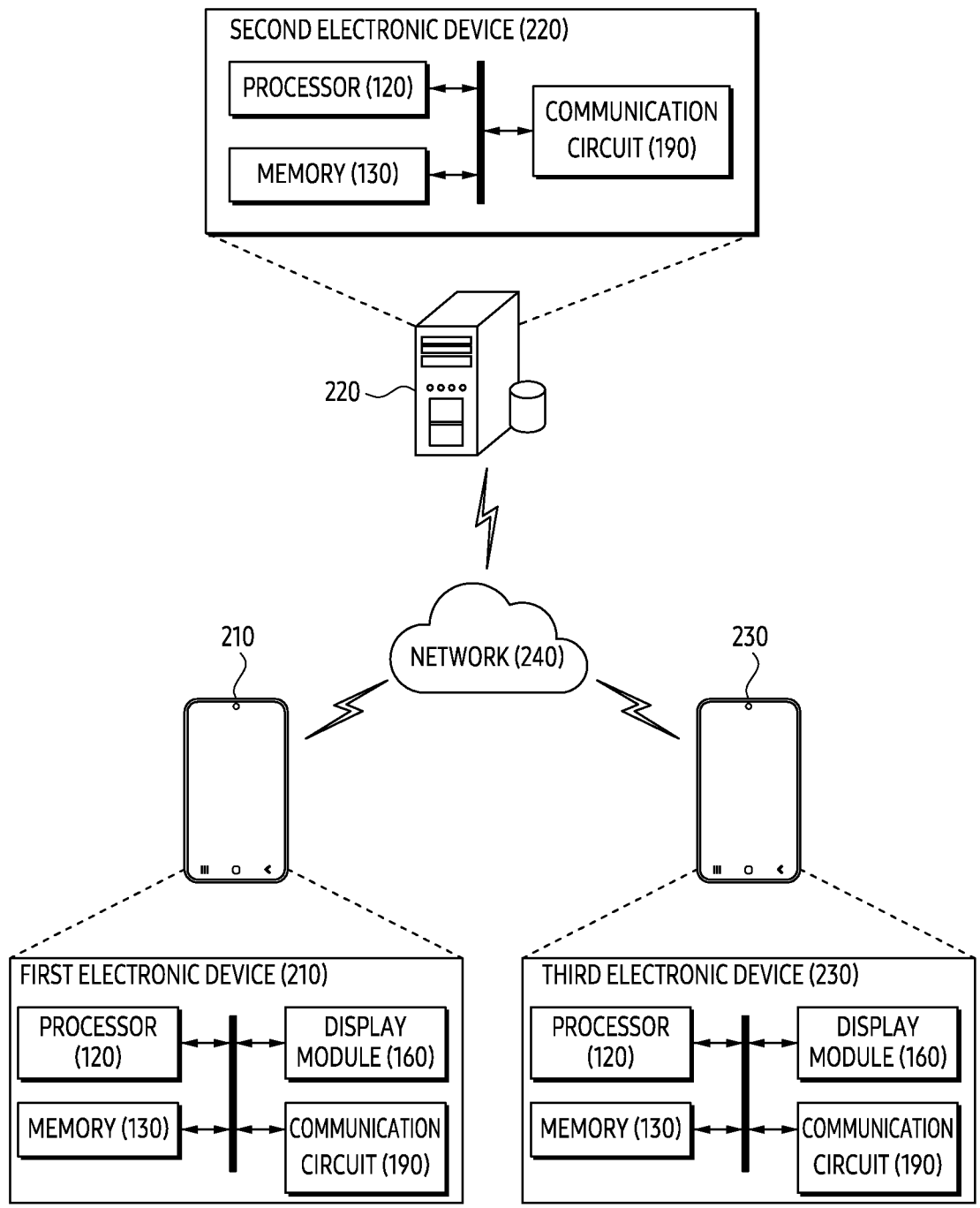
FIG. 2 illustrates an example of electronic devices interconnected by a network according to an embodiment.

FIG. 2 illustrates an example of electronic devices 210, 220, and 230 interconnected by a network 240 according to an embodiment. Referring to FIG. 2, an exemplary state in which the electronic devices 210, 220, and 230 are connected to each other based on the network 240 is illustrated. The electronic devices 210, 220, and 230 of FIG. 2 may be examples of the electronic device 101 of FIG. 1. The network 240 may include a wired network and/or a wireless network. The wired network may include a network such as Internet, local area network (LAN), wide area network (WAN), Ethernet, or a combination thereof. The wireless network may include a network such as long term evolution (LTE), 5G new radio (NR), 6G, wireless fidelity (Wi-Fi), Zigbee, near field communication (NFC), Bluetooth, Bluetooth low-energy (BLE), or a combination thereof. The electronic devices 210, 220, and 230 may be indirectly connected by the network 240, through one or more router and/or access point (AP).

Hereinafter, an embodiment in which a plurality of media contents are transmitted and/or received based on the electronic devices 210, 220, and 230 will be described. The electronic device 210 may be referred to as the first electronic device 210 in terms of being a source of media content to be transmitted by the network 240. The electronic device 220 may be referred to as the second electronic device 220 in terms of being a relay of media contents in the network 240. The electronic device 230 may be referred to as the third electronic device 230 in terms of being a target of media content to be transmitted by the network 240. Although an embodiment in which media contents is transmitted to a single third electronic device 230 is described based on the following drawings, the embodiment is not limited thereto. For example, the number of the third electronic devices 230 receiving media contents may be one or more.

Referring to FIG. 2, each of the first electronic device 210 and the third electronic device 230 may be a terminal owned by a user. For example, the terminal may include a personal computer (PC) such as a laptop and a desktop, a smartphone, a smart pad, a tablet PC, and a smartwatch, and smart accessories such as a head-mounted device (HMD). Users of each of the first electronic device 210 and the third electronic device 230 may be subscribers to a service provided by the second electronic device 220.

Referring to FIG. 2, the second electronic device 220 may include a server of a service provider. The server may include one or more PCs and/or workstations. In an embodiment, the service provider may operate a service for exchanging messages between subscribers by using the second electronic device 220. For example, the service operated by the second electronic device 220 may be referred to as a short message service (SMS), a long message service (LMS), a multimedia messaging service (MMS), a rich communication service (RCS), and/or an instant messenger service. Although only one second electronic device 220 is illustrated, the number of second electronic devices 220 may be one or more.

Referring to FIG. 2, an example of hardware included in the first electronic device 210, the second electronic device 220, and the third electronic device 230 is illustrated based on a block diagram. Each of the first electronic devices 210 to the third electronic device 230 may include at least one of a processor 120, a memory 130, or a communication circuit 190. In an embodiment in which the first electronic device 210 and the third electronic device 230 are terminals, each of the first electronic device 210 and the third electronic device 230 may further include a display module 160. Each of the processor 120, the memory 130, the display module 160, and the communication circuit 190 of FIG. 2 may be an example of the processor 120, the memory 130, the display module 160, and the communication circuit 190 of FIG. 1. In each of the first electronic device 210 to the third electronic device 230, at least one of the processor 120, the memory 130, the display module 160, or the communication circuit 190 may be electrically and/or operably coupled with each other by an electronic component such as a communication bus. Hereinafter, operably coupled hardware components may indicate that a direct connection or indirect connection between hardware components is established wired or wirelessly, so that the second hardware component is controlled by the first hardware component among the hardware components.

Referring to FIG. 2, although the hardware components included in each of the first electronic device 210 to the third electronic device 230 are illustrated based on different blocks, the embodiment is not limited thereto, and a part (e.g., at least a part of the processor 120, the memory 130, or the communication circuit 190) of the hardware components illustrated in FIG. 2 may be included in the single integrated circuit, such as system on a chip (SoC). The type and/or the number of hardware components included in each of the first electronic device 210 to the third electronic device 230 are not limited as illustrated in FIG. 2. For example, at least one of the first electronic device 210 to the third electronic device 230 may include only some of the hardware components illustrated in FIG. 2, or may include hardware components (e.g., at least one hardware component represented by the different blocks in FIG. 1) not illustrated in FIG. 2.

According to an embodiment, the processors 120 of the first electronic device 210 to the third electronic device 230 may include a hardware component for processing data based on one or more instructions. For example, the hardware component for processing data may include an arithmetic and logic unit (ALU), a floating point unit (FPU), a field programmable gate array (FPGA), and/or a central processing unit (CPU). The number of the processors 120 may be one or more. For example, the processor 120 may have a structure of a multi-core processor such as a dual core, a quad core, or a hexa core. The processor 120 of FIG. 2 may include the processor 120 of FIG. 1.

According to an embodiment, the memory 130 of the first electronic device 210 to the third electronic device 230 may include a hardware component for storing data and/or instructions input and/or output to and from the processor 120. For example, the memory 130 may include a volatile memory such as random-access memory (RAM) and/or a non-volatile memory such as read-only memory (ROM). For example, the volatile memory may include at least one of dynamic RAM (DRAM), static RAM (SRAM), Cache RAM, or pseudo SRAM (PSRAM). For example, the non-volatile memory may include at least one of programmable ROM (PROM), erasable PROM (EPROM), electrically erasable PROM (EEPROM), flash memory, hard disk, compact disk, or embedded multi-media card (eMMC). The memory 130 of FIG. 2 may include the memory 130 of FIG. 1.

Referring to FIG. 2, one or more instructions indicating a calculation and/or an operation to be performed on data by the processor 120 may be stored in the memory 130. A set of one or more instructions may be referred to as firmware, operating system, process, routine, sub-routine, and/or application. For example, when a set of a plurality of instructions deployed in the form of operating system, firmware, driver, and/or application is executed, the first electronic device 210 to the third electronic device 230 may perform at least one of the operations of FIGS. 9 to 14. Hereinafter, the fact that the application is installed in an electronic device (e.g., at least one of the first electronic device 210 to the third electronic device 230) may indicate that one or more instructions provided in the form of the application are stored in the memory 130, and mean that the one or more applications are stored in an executable format (e.g., a file having an extension designated by the operating system of the electronic device 101) by the processor 120.

In an embodiment, in order to support a service for exchanging a message, an application related to the service may be distributed within the network 240. Hereinafter, the messenger application (or client application) may mean an application installed in a terminal (e.g., the first electronic device 210, and/or the third electronic device 230), in order for the transmission and/or reception of a message relayed between the first electronic device 210 and the third electronic device 230 by the second electronic device 220. Hereinafter, a server application (or host application) may mean an application installed on the same server as the second electronic device 220 for supporting the service.

According to an embodiment, an operation in which a signal such as a message is exchanged between one or more terminals (e.g., the first electronic device 210 and the third electronic device 230) in which a messenger application is installed and a server (e.g., the second electronic device 220) in which a server application is installed will be described with reference to FIG. 9. An example of a user interface (UI) displayed by the first electronic device 210 in which a messenger application is installed will be described with reference to FIGS. 3 to 5 and/or 8. An example of an operation performed by the first electronic device 210 based on the messenger application will be described with reference to FIG. 10. An example of the UI displayed by the third electronic device 230 in which the messenger application is installed will be described with reference to FIGS. 5 to 8. An example of an operation performed by the third electronic device 230 based on the messenger application will be described with reference to FIG. 10. An example of an operation performed by the second electronic device 220 based on the server application will be described with reference to FIG. 11, according to an embodiment.

According to an embodiment, the display module 160 of the first electronic device 210 to the third electronic device 230 may output visualized information (e.g., at least one of screens of FIGS. 3 to 8) to a user. For example, the display module 160 may be controlled by a controller such as processor 120 to output visualized information to a user. The display module 160 may include a flat panel display (FPD) and/or an electronic paper. The FPD may include a liquid crystal display (LCD), a plasma display panel (PDP), and/or one or more light emitting diode (LED). The LED may include an organic LED (OLED). The display module 160 of FIG. 2 may include the display module 160 of FIG. 1.

According to an embodiment, the display module 160 may include a sensor (e.g., a touch sensor panel (TSP)) for detecting an external object (e.g., a user's finger) on a display area formed by the display module 160. For example, a terminal (e.g., the first electronic device 210 and/or the third electronic device 230) including the display module 160 may detect an external object in contact with the display area or floating on the display area, based on the TSP. In response to detecting the external object, the terminal may execute a function related to a specific visual object corresponding to a position of the external object on the display area among visual objects displayed in the display area.

According to an embodiment, the communication circuit 190 of the first electronic device 210 to the third electronic device 230 may include a hardware component for supporting transmission and/or reception of an electrical signal between the first electronic device 210 to the third electronic device 230 within the network 240. For example, the communication circuit 190 may include at least one of a modem (MODEM), an antenna, or an optic/electronic (O/E) converter. The communication circuit 190 may support transmission and/or reception of an electrical signal based on various types of protocols such as Ethernet, local area network (LAN), wide area network (WAN), wireless fidelity (Wi-Fi), Bluetooth, Bluetooth low energy (BLE), ZigBee, long term evolution (LTE), 5G new radio (NR), and/or other such protocols. The communication circuit 190 of FIG. 2 may include the communication circuit 190 of FIG. 1.

According to an embodiment, the first electronic device 210 may obtain a message to be transmitted from the user of the first electronic device 210 to the user of the third electronic device 230. The message may include text including one or more characters, image, video, audio, or a combination thereof. The first electronic device 210 may transmit a message obtained from a user to a server (e.g., the second electronic device 220) for exchanging the message. The second electronic device 220 may transmit the received message to the third electronic device 230 specified by the message and/or the first electronic device 210, based on receiving the message. The message exchanged between the first electronic device 210 to the third electronic device 230 may be generated based on a format (e.g., an RCS message format) related to RCS.

In an embodiment, the message exchanged between the first electronic device 210 to the third electronic device 230 may be a signal having a specified format (e.g., an RCS message format) and/or a unit of a packet. The message may include information indicating a target to receive the message, and/or information to be displayed by the electronic device. The information indicating the target included in the message may include data (e.g., at least one of name, phone number, or mail address) for identifying a user to receive the message, and/or data (e.g., media access control (MAC) address, and/or IP address of the electronic device) for identifying an electronic device (in an embodiment of FIG. 2, the third electronic device 230) to receive the message. For example, a single message may be used as a unit for calculating charges within a service (e.g., RCS) provided by the second electronic device 220. For example, the single message may be visualized as a single bubble by a terminal such as the first electronic device 210 and/or the third electronic device 230. An example of a bubble visualized by a terminal will be described with reference to FIGS. 3 to 7.

According to an embodiment, media content including at least one of an image, video, or audio may be exchanged, based on a message exchanged between the first electronic device 210 to the third electronic device 230. For example, single message exchanged between the first electronic device 210 to the third electronic device 230 may include single media content. In an embodiment, a terminal such as the first electronic device 210 and/or the third electronic device 230 may intensively display a plurality of media contents obtained based on the exchange of a plurality of messages in a single bubble. For example, the terminal may determine whether to display intensively the plurality of media contents obtained from the plurality of messages in a single bubble, based on information common to the plurality of messages.

According to an embodiment, since a terminal such as the first electronic device 210 and/or the third electronic device 230 displays intensively a plurality of media contents, a user of the terminal may efficiently browse the plurality of media contents within the display module 160. According to an embodiment, a terminal transmitting a plurality of media contents, such as the first electronic device 210, may individually display a UI for controlling transmission of at least one of the plurality of media contents while transmitting the plurality of media contents. According to an embodiment, a terminal receiving a plurality of media contents, such as the third electronic device 230, may display one or more media contents completely received by the terminal among the plurality of media contents, in a state in which the plurality of media contents are partially received. For example, while transmitting the plurality of media contents as a group (or as a collection), the third electronic device 230 may support browsing of one or more media contents (e.g., one or more media contents completely received by the third electronic device 230) before receiving all of the plurality of media contents.

As described above, according to an embodiment, the first electronic device 210 to the third electronic device 230 may operate collaboratively based on a service for exchanging messages. The cooperative operation may include an operation of transmitting a plurality of media contents as a group by the first electronic device 210. The cooperative operation may include an operation of transmitting a plurality of messages including each of a plurality of media contents by the first electronic device 210 and/or the second electronic device 220. The cooperative operation may include an operation of displaying intensively the plurality of media contents based on reception of a plurality of messages by the third electronic device 230. The cooperative operation may include an operation of exploring at least one media content based on at least one received message in a state in which some of a plurality of messages by the third electronic device 230 are received. The cooperative operation may include an operation of executing individually a function related to at least one media content (e.g., a function of identifying a user's reaction, a function of sharing media content) within a group of a plurality of media contents. Based on the cooperative operation, the first electronic device 210 to the third electronic device 230 may improve a user experience related to exchanging a plurality of media contents as a group to the user.

Hereinafter, an operation of the first electronic device 210 for transmitting a plurality of media contents as a group will be described with reference to FIG. 3.

Figure 3:
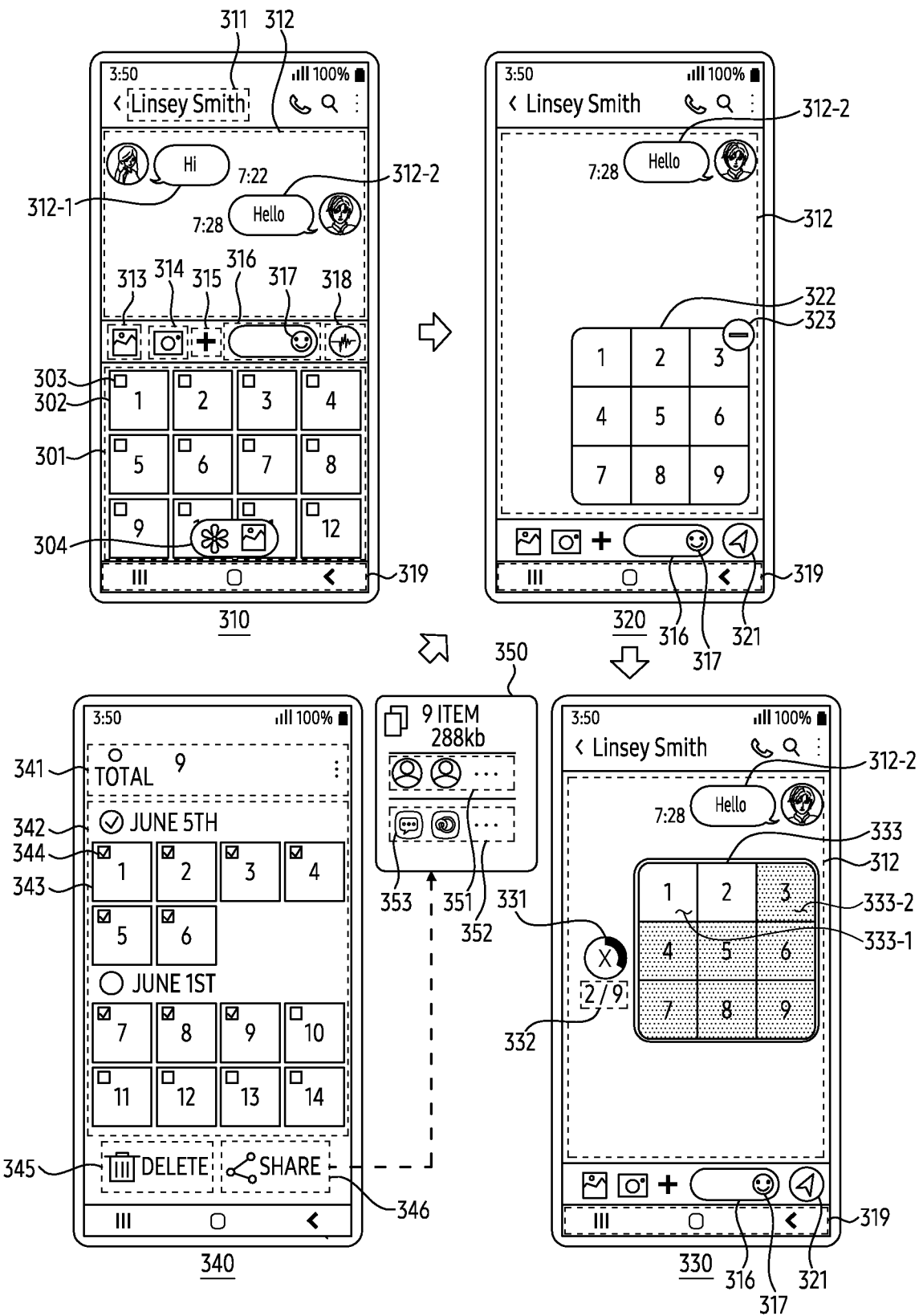
FIG. 3 illustrates exemplary screens displayed by a first electronic device and for transmitting media contents, according to an embodiment.

FIG. 3 illustrates exemplary screens 310, 320, 330, and 340 displayed by a first electronic device and for transmitting media contents, according to an embodiment. The first electronic device of FIG. 3 may be an example of the first electronic device 210 of FIG. 2. For example, the screens 310, 320, 330, and 340 of FIG. 3 may be displayed based on the display module 160 of the first electronic device 210 of FIG. 2. Referring to FIG. 3, the screens 310, 320, and 330 provided by a first electronic device to a user are illustrated in a state in which media content based on a message is exchanged. The first electronic device may display any one of the screens 310, 320, and 330 based on the execution of the messenger application. The first electronic device may display the screen 340 based on another application different from the messenger application. Hereinafter, the screen may mean a UI displayed within at least a part of a display. For example, the screen may include an activity of an Android operating system.

Referring to FIG. 3, according to an embodiment, the first electronic device may display a screen 310 based on the execution of the messenger application. The first electronic device may display the screen 310 in response to a selection of a chat room and/or a channel by interaction between the messenger application and the user of the first electronic device. For example, the screen 310 may correspond to one of a plurality of chat rooms distinguished by the messenger application of the first electronic device. The plurality of chat rooms may be different groups of messages transmitted or received by a user of the first electronic device based on the messenger application. The plurality of chat rooms may be classified based on an addressee of a message obtained by the first electronic device from a user, and/or a sender of a message received from a server, such as the second electronic device 220 in FIG. 2. The plurality of chat rooms are not limited to the examples described above, and may be a group chat room including a plurality of addressee. For example, the first electronic device may support the exchange of messages between at least two or more users including a user of the first electronic device based on the chat room.

Referring to FIG. 3, according to an embodiment, the first electronic device may display a visual object 311 including at least one of an icon, an image, or text for identifying a chat room in the screen 310. For example, the visual object 311 displayed by the first electronic device in the screen 310 may represent one or more users related to a chat room corresponding to the screen 310. For example, the visual object 311 may include at least one of an icon, an image, or text (e.g., the names of the one or more users) for specifying the one or more users. For example, the visual object 311 may include an icon, an image, or text assigned to the chat room (e.g., the name of the chat room).

Referring to FIG. 3, according to an embodiment, the first electronic device may display a message exchanged or being exchanged based on single chat room within an area 312 of the screen 310. In the area 312, the first electronic device may display a list of scrollable messages to the user. For example, the first electronic device may display a list of messages within the area 312 based on a recycler view. In area 312, the first electronic device may display messages in ascending order of the time when the messages are transmitted along a specified direction (e.g., a direction from the top to the bottom of screen 310). The display of messages by the first electronic device in the area 312 is not limited to the specified direction. For example, the first electronic device may display messages in the area 312 along a direction perpendicular to the specified direction. For example, messages may be arranged within the area 312 based on a grid and/or tile.

Referring to FIG. 3, an example of messages displayed by the first electronic device in the area 312 of the screen 310 is illustrated. In the area 312, the first electronic device may display messages based on visual objects such as bubbles 312-1 and 312-2. The bubbles 312-1 and 312-2 may have a form based on a balloon word. For example, the first electronic device may display messages within a part of a display area separated by an outline of each of the bubbles 312-1 and 312-2. The forms of the bubbles 312-1 and 312-2 are not limited to an embodiment of FIG. 3. In case that the first electronic device displays messages in ascending order of the time when the messages are transmitted along the direction from the top to the bottom of the screen 310 in the area 312, a message corresponding to the bubble 312-1 may be a message in the past than another message corresponding to the bubble 312-2.

Referring to FIG. 3, the relative positions of the bubbles 312-1 and 312-2 may indicate the order in which messages corresponding to the bubbles 312-1 and 312-2 are transmitted, and/or the user who generated the messages. For example, the first electronic device may indicate that the specific bubble is generated by a user of the first electronic device by arranging the specific bubble adjacent to the right side among the right side or the left side of the screen 310, such as the bubble 312-2. Within the above example, the first electronic device may indicate that the specific bubble is generated by another user different from the user of the first electronic device by arranging the specific bubble adjacent to the left side, such as the bubble 312-1.

Referring to FIG. 3, according to an embodiment, the first electronic device may include visual objects 313, 314, 315, 316, 317, and 318 for obtaining information to be included in a message from a user of the first electronic device. For example, in order to add a media content stored in the first electronic device to the message, the first electronic device may display a visual object 313 such as an icon for browsing the media content stored in the first electronic device. For example, the first electronic device may display a visual object 314 such as an icon for displaying another screen for controlling the camera in order to add a media content obtained from the camera (e.g., the camera module 180 of FIG. 1) of the first electronic device to the message. For example, the first electronic device may display a visual object 316 such as a text box for displaying text to be added to a message. For example, the first electronic device may display a visual object 317 such as an icon for selecting an emoticon to be combined with text in a message. For example, the first electronic device may display a visual object 318 for initiating a recording based on microphone of the first electronic device in order to add an audio signal to the message. For example, the first electronic device may display a visual object 315 such as an icon for adding at least one of information (e.g., account information, documents, and/or spreadsheets for remitting) browsable by other applications different from the messenger application, GPS coordinates, hyperlinks, or tags, in a message.

Referring to FIG. 3, according to an embodiment, the first electronic device may display a list of media contents stored in the first electronic device in the area 301 within the screen 310, in response to a user input indicating that the visual object 313 is selected. For example, the first electronic device may enlarge the area 301 by shifting the visual object 313 away from the navigation bar 319 in response to the user input. The screen 310 of FIG. 3 illustrates an example in which the first electronic device displays a plurality of media contents in the area 301 enlarged based on shifting of the visual object 313.

Referring to FIG. 3, in the area 301, the first electronic device may display a list of media contents scrollable by a user. The first electronic device may display reduced images (e.g., thumbnails) of media contents based on the grid in the area 301. The first electronic device may change visible media contents by the area 301 based on the drag gesture and/or swipe gesture initiated in the area 301. The first electronic device may display a menu 304 for executing another application, which is different from the messenger application, for browsing media contents, in the area 301. In the menu 304, the first electronic device may display at least one icon indicating at least one application for browsing media contents among applications installed in the first electronic device. Based on identifying an input indicating that another application different from the messenger application is selected based on menu 304, the first electronic device may overlap another screen (e.g., the screen 340) based on execution of the other application on the screen 310.

According to an embodiment, the first electronic device may receive a user input indicating that at least one media content is selected, based on the list of the area 301 of the screen 310. Referring to FIG. 3, thumbnails representing images in which numbers 1 to 12 are captured may be displayed in the area 301 as an example of media contents stored in the first electronic device. For example, thumbnail 302 may represent an image in which the number 1 is captured. According to an embodiment, the first electronic device may display a visual object for distinguishing at least one media content selected by the user input from another media content, within the list of the area 301. For example, the first electronic device may display at least one visual object for highlighting at least one media content selected by the user input by overlapping thumbnails in the area 301.

Referring to FIG. 3, the first electronic device may display a visual object 303 for indicating whether an image corresponding to the thumbnail 302 is selected by a user on the thumbnail 302. The visual object 303 may include a check box and/or a radio button. For example, the first electronic device may change the color of the visual object 303, based on a user input indicating that media content corresponding to the thumbnail 302 is selected. For example, the first electronic device may change an image and/or an icon in the visual object 303 based on the user input. For example, the first electronic device may change text in the visual object 303 based on the user input. Changing the visual object 303 by the first electronic device based on the user input is not limited to the above example.

According to an embodiment, the first electronic device may receive a user input for selecting a plurality of media contents based on another screen different from the screen 310 displayed based on the execution of the messenger application. The screen 340 of FIG. 3 may be an example of a screen displayed by the first electronic device based on the execution of another application different from the messenger application. For example, the screen 340 may be displayed by the other application for browsing media contents stored in the first electronic device, such as a gallery application. For example, the screen 340 may be displayed in response to an input indicating that an icon representing a gallery application is selected within the menu 304 in the screen 310.

Referring to FIG. 3, in the screen 340, the first electronic device may display at least one of media contents stored in the first electronic device based on execution of the gallery application. For example, the first electronic device may perform an operation of browsing media contents based on a user's gesture received within area 342 of the screen 340, such as a drag gesture. In the area 342, the first electronic device may classify media contents, based on at least one of the date, location on which the media content was created, or data within metadata of media contents (e.g., tags, and/or data representing subjects). Referring to FIG. 3, an example in which the first electronic device classifies media contents in the area 342 based on the date on which the media contents are created is illustrated. In the area 342, the first electronic device may display reduced images (e.g., thumbnails) of each of the media contents.

Referring to FIG. 3, the first electronic device may identify a user input indicating that one or more media contents are selected based on the screen 340. For example, the first electronic device may enter a state for receiving an input indicating that one or more media contents are selected, based on a user input indicating that reduced media content (or a thumbnail that represents media content) displayed in the area 342. After changing to the state, in the area 341 within the screen 340, the first electronic device may display a text indicating the number of media contents selected by a user and/or a visual object for selecting all media contents stored in the first electronic device.

In the state for receiving an input indicating that one or more media contents are selected based on the screen 340, the first electronic device may display one or more visual objects indicating that media contents are individually selected based on the input. For example, the first electronic device may enter the state based on a long-touch gesture regarding the thumbnail 343 in the area 342. The first electronic device may overlap and display a visual object 344 such as a check box overlapping the thumbnail 343 within the state. The user may select media content (e.g., an image in which the number 1 is captured) corresponding to the thumbnail 343 or release the selection, based on the gesture of touching and/or clicking the visual object 344, and/or the thumbnail 343. The first electronic device may visualize whether the thumbnail 343 corresponding to the visual object 344 is selected by using the visual object 344.

In the state for receiving an input indicating that one or more media contents are selected based on the screen 340, the first electronic device may display visual objects 345 and 346 for executing a function based on one or more media contents selected by the user in the screen 340. For example, the visual object 345 may have a form of a button for executing a function for removing one or more media contents selected by the user or moving them a designated directory (e.g., a trash can). The visual object 345 may include designated text such as "delete". For example, the visual object 346 may have a form of a button for executing one or more functions provided by another application in the first electronic device different from the gallery application for displaying screen 340, based on one or more media contents selected by the user. The visual object 346 may include designated text such as "share". Referring to FIG. 3, in response to an input indicating that the visual object 346 is selected, the first electronic device may display a window 350 for receiving an input indicating that the one or more functions are selectively executed in the screen 340. The window 350 may be displayed by overlapping on at least a part of the screen 340.

Referring to FIG. 3, after receiving a user input indicating that the first electronic device selects images in which the numbers 1 to 9 are captured based on the screen 340, an example of the window 350 displayed in response to an input to the visual object 346 is illustrated. The first electronic device may display representative information of the images, such as the number and/or the total size of the images selected by the received user input. In the area 351 of the window 350, the first electronic device may display a list for selecting a user to transmit the images selected by the user input. For example, the first electronic device may display a list of one or more users (e.g., one or more users stored in the first electronic device based on an address book application) different from the user of the first electronic device in the area 351. For example, the first electronic device may display a list of one or more external electronic devices connected to an access point (AP) connected to the first electronic device in the area 351. For example, based on the area 351, the first electronic device may receive an input for executing a function of transmitting the images based on Wi-Fi direct and/or Bluetooth.

Referring to FIG. 3, in the area 352 of the window 350, the first electronic device may display a list of at least one application different from the gallery application corresponding to the screen 340 and accessible to images selected by the user input, among the applications installed in the first electronic device. In the area 352, the first electronic device may display at least one icon corresponding to the at least one application. In the area 352, the first electronic device may execute the messenger application based on the images in response to an input indicating that the icon 353 corresponding to the messenger application is selected. The first electronic device may display the screen 320 based on the execution of the messenger application.

Hereinafter, it is assumed that the first electronic device receives a user input indicating that images captured to numbers 1 to 9 are selected in the area 301 based on the screen 310. Referring to FIG. 3, after receiving a user input indicating that images captured to numbers 1 to 9 are selected, the first electronic device may display the screen 320. For example, after receiving the user input, in response to another user input indicating that another part different from the area 301 is selected within the screen 310, the first electronic device may display the screen 320. While changing from the screen 310 to the screen 320, the first electronic device may reduce the area 301.

Referring to FIG. 3, in the screen 320, the first electronic device may display a visual object 322 for indicating a preview of media contents (e.g., nine images in which numbers 1 to 9 are captured) selected by a user. The visual object 322 may guide a form in which the media contents are to be displayed in the area 312 before transmission of media contents selected by the user. For example, the visual object 322 may guide a form in which the media contents are displayed in the screen of the electronic device (e.g., the third electronic device 230 of FIG. 2) of the addressee. For example, the visual object 322 may indicate that media content is displayed as a group (or collection). In the above example, the visual object 322 may be displayed based on a form of the bubble 312-2. For example, the visual object 322 may be a bubble indicating a group of media contents selected by a user.

Referring to FIG. 3, the first electronic device may display information related to media contents included in the visual object 322, at a position adjacent to the visual object 322. For example, the first electronic device may display at least one of the sum of sizes of the media contents or the number of the media contents. According to an embodiment, the first electronic device may display a visual object 323 such as an icon for excluding media contents included in the visual object 322 from the message, at a position adjacent to the visual object 322. The first electronic device may cease at least temporarily or terminate displaying of the visual object 322 in the screen 320.

According to an embodiment, the first electronic device may obtain other content to be transmitted together with media contents displayed as a group by the visual object 322, based on the visual objects 316 and 317 in the screen 320. For example, the other content may include text and/or an emoticon received from a user of the first electronic device. In the visual object 316, the first electronic device may display a preview of the other content. In the screen 320, the first electronic device may display a visual object 321 such as a send button for initiating transmission of media contents integrated within the visual object 322 and other contents guided by the visual object 316.

According to an embodiment, the first electronic device may initiate transmission of media contents grouped by the visual object 322, in response to an input indicating that the visual object 321 is selected. Referring to FIG. 3, in response to the input, the first electronic device according to an embodiment may display a screen 330. In a moment in a state in which the first electronic device transmits media content (e.g., nine images selected based on the screen 310) to the second electronic device (e.g., a server such as the second electronic device 220 of FIG. 2), the screen 330 may be displayed. In the screen 330, the first electronic device may display a bubble 333 indicating that a group of media contents is transmitted to the second electronic device, in the area 312 for displaying a scrollable list of messages. The first electronic device may display the bubble 333 at a position adjacent to the right side of the screen 330, in order to indicate that the bubble 333 is generated by the user of the first electronic device.

According to an embodiment, the first electronic device may receive a user input indicating that a plurality of media contents are transmitted to an external electronic device, such as an input selecting the visual object 321 in the screen 320. In response to the user input, the first electronic device may initiate transmitting the plurality of media contents to the external electronic device by using a communication circuit (e.g., the communication circuit 190 of the first electronic device 210 of FIG. 2). For example, the first electronic device may establish a communication link between the second electronic device (e.g., the second electronic device 220 in FIG. 2) and the first electronic device within the network (e.g., the network 240 in FIG. 2) based on the execution of the messenger application. Through the communication link, the first electronic device may transmit at least one message having another user (e.g., the user of the third electronic device 230 in FIG. 2) who set by a chat room corresponding to the screen 320 that the user input selecting the visual object 321 is received, as an addressee. The first electronic device may transmit at least one message including a plurality of media contents to the second electronic device. For example, the first electronic device may request the second electronic device to relay a plurality of media contents included in the bubble 333 of the screen 330 to another user displayed on the screen 330. While transmitting the plurality of media contents, the first electronic device may display a plurality of visual objects (e.g., thumbnails in the bubble 333) that respectively represent the plurality of media contents, such as the screen 330.

According to an embodiment, the first electronic device may transmit a plurality of media contents to a second electronic device that is a server of a messenger application. The first electronic device may transmit information for displaying a plurality of media contents, based on one group, one collection, and/or one bubble, to the second electronic device together with the plurality of media contents. The information may include the number (on the above assumption, nine) of a plurality of media contents. The information may include an identifier assigned to a group of the plurality of media contents. The identifier may be a value uniquely assigned to the group. The information may include a timestamp based on milliseconds. For example, the first electronic device may transmit a timestamp indicating a time at which the user input indicating that visual object 321 is selected is received, and/or a time at which transmission of the plurality of media contents to the second electronic device is initiated, to the second electronic device, as information for displaying the plurality of media contents as a group. The information may be transmitted together with the plurality of media contents, by another electronic device to receive a plurality of media contents (e.g., the third electronic device 230 of FIG. 2), in order to display the plurality of media contents as a group.

According to an embodiment, the first electronic device may transmit a plurality of messages including each of a plurality of media contents to the second electronic device. The first electronic device may generate the plurality of messages in response to an input indicating that the visual object 321 is selected in the screen 320. On the above assumption, the first electronic device may transmit nine messages including each of nine media contents to the second electronic device. Each of the nine messages may include media content stored in a message, a collection in which the media content is to be displayed, and/or information related to a bubble. For example, the information included in a specific message may be a parameter for displaying media content in the specific message together with media content in other messages, and may include a parameter having an identifier (or field name) such as "groupID". For example, the information included in a specific message may be a parameter for distinguishing a collection and/or a bubble corresponding to the specific message, and may include a parameter having an identifier (or field name) such as "uniqueKey". On the above assumption, a parameter corresponding to the field name "groupID" may have a matched value in the nine messages including each of the nine media contents. On the above assumption, a parameter corresponding to the field name "uniqueKey" may have a matched value (e.g., a timestamp of the moment in which the input is identified), in the nine messages including each of the nine media contents. For example, the information included in the specific message may be a parameter for indicating a state in which the specific message or another message transmitted with the specific message is transmitted, and include a parameter having an identifier (or field name) such as "messageStatus". On the above assumption, a parameter included in each of the nine messages and corresponding to the field name "messageStatus" may indicate a state in which the nine messages are transmitted to the second electronic device based on a specified value. For example, the information included in the specific message may be a parameter for indicating the order of the specific message within a plurality of messages including the specific message, and include a parameter having an identifier (or field name) such as "seqId". On the above assumption, the nine messages may include numbers indicating the order of media contents included in the message, within a bubble. For example, in a message including an image where the number 1 is captured, a parameter corresponding to the field name "seqId" may include the numbers (e.g., "0" and/or "1") indicating that the image is displayed first in the bubble. The information included in the specific message may be a parameter indicating a user's reaction regarding the specific message, and include a parameter having an identifier (or field name) such as "accountInfo". The information included in the specific message may be a parameter indicating the number of media contents displayed in single collection and/or single bubble by a plurality of messages including the specific message, and include a parameter having an identifier (or field name) such as "totalNum". On the above assumption, the nine messages may include the number "9" as a parameter corresponding to the field name "totalNum".

According to an embodiment, in response to completion of receiving a message from the first electronic device, the second electronic device may transmit a designated message for notifying the completion of reception of the message to the first electronic device. On the above assumption, the second electronic device may transmit a designated message for notifying the completion of reception of each of the nine messages to the first electronic device, whenever reception of each of the nine messages is completed. According to an embodiment, the second electronic device may store and/or manage information related to a message exchanged between a plurality of external electronic devices (e.g., the first electronic device 210 and/or the third electronic device 230 of FIG. 2) connected by the second electronic device, based on a database. For example, on the above assumption, Table 1 may be an example of a database stored and/or managed by the second electronic device that has received nine messages.

"groupId" field of the database in Table 1, an identifier uniquely assigned to single collection and/or single bubble corresponding to the message may be stored as a parameter included in the message received by the second electronic device. A value indicating a state in which the second electronic device receives a message may be stored in the "messageStatus" field of the database of Table 1. In an example of Table 1, the value "1305" stored in the "messageStatus" field may indicate that the reception of the message is completed. The value "1304" stored in the "messageStatus" field may indicate that the reception of the message is in progress. An operation in which the second electronic device transmits a designated message (e.g., an acknowledgement (ACK) message) indicating that the reception of the message is completed to the first electronic device may be performed substantially simultaneously with an operation in which the second electronic device changes a value stored in the "messageStatus" field of the record corresponding to the message in the database, from the exemplified "1305" to "1304". Data indicating a user's reaction regarding a message may be stored in the "recountInfo" field of the database of Table 1. In the "seqId" field of the database in Table 1, an index indicating the order of media content related to the message may be stored within a single collection, and/or a single bubble, where the message will be displayed. A value and/or a field stored in the database are not limited to the example of Table 1.

As described above with reference to Table 1, according to an embodiment, the second electronic device may manage a plurality of messages grouped into a single bubble using a database. For example, when a single bubble is displayed based on a single message, a value stored in the fields of Table 1 (e.g., the "totalNum" field and/or the "seqId" field) may be 0. According to an embodiment, the second electronic device may transmit at least a part of information

TABLE 1

| | | field | | | | |
|---|---|---|---|---|---|---|
| key value | uniqueKey | totalNum | groupId | messageStatus | recountInfo | seqId |
| 1 | 1657177124770 | 9 | 143 | 1305 | 0 | 1 |
| 2 | 1657177124770 | 9 | 143 | 1305 | 0 | 2 |
| 3 | 1657177124770 | 9 | 143 | 1304 | 0 | 3 |
| 4 | 1657177124770 | 9 | 143 | 1304 | 0 | 4 |
| 5 | 1657177124770 | 9 | 143 | 1304 | 0 | 6 |
| 6 | 1657177124770 | 9 | 143 | 1304 | 0 | 7 |
| 8 | 1657177124770 | 9 | 143 | 1304 | 0 | 8 |
| 9 | 1657177124770 | 9 | 143 | 1304 | 0 | 9 |

The key value of Table 1 may be a parameter uniquely assigned to an entity and/or a record in the database. For example, the nine rows in Table 1 may correspond to records generated by the second electronic device in the database, based on receiving the nine messages of the assumption from the first electronic device. In the "uniqueKey" field of the database in Table 1, a time stamp indicating a moment (e.g., moment receiving an input indicating that the visual object 321 of FIG. 3 is selected) receiving an input indicating that the message is transmitted may be stored as a parameter included in the message received by the second electronic device. In the "totalNum" field of the database in Table 1, the number (e.g., on the above assumptions, "9") of single collection including media content included in the message and/or the number of media content displayed in single bubble may be stored as a parameter included in the message received by the second electronic device. In the stored in the database of Table 1 to another electronic device (e.g., the third electronic device 230 of FIG. 2) that will receive a message. The other electronic device may determine whether to display a plurality of messages in a single bubble based on at least a part of the information.

Referring to FIG. 3, in the screen 330, the first electronic device according to an embodiment may display a progress in which a plurality of media contents are transmitted based on the bubble 333. For example, the first electronic device may display visual objects (e.g., thumbnails corresponding to each of the plurality of media contents) respectively representing a plurality of media contents in the bubble 333. In the bubble 333, the first electronic device may visualize whether transmission of media contents corresponding to each of the visual objects is completed based on a tone of the visual objects. For example, the first electronic device may display a progress of transmitting the image to the second electronic device, by adjusting a tone, and/or alpha value of the visual object 333-1 which is a thumbnail representing the captured image of the number 1. Independently of displaying the progress of the image in which number 1 is captured based on the visual object 333-1, the first electronic device may display a progress of transmitting the other image to the second electronic device, by adjusting a tone, and/or alpha value of the visual object 333-2 which is a thumbnail representing the captured image of the number 3. The alpha value can be an opacity level that makes an image appear more or less translucent relative to a background of the image. For example, the operation of an electronic device (e.g., the first electronic device) adjusting a visual aspect of a visual object (e.g., the visual object 333-2) may comprises, adjusting a visual appearance and/or representation of the visual object such as adjusting a tone, an alpha value and/or a translucent of the visual object.

Referring to FIG. 3, the first electronic device may display the text indicating the progress by using the visual object 332 related to the bubble 333. Referring to FIG. 3, the text may include at least one of the number of media contents (on the above assumption, 9) and/or the number of media contents transmitted to the second external electronic device (e.g., in a moment where the screen 330 is displayed, 2). The first electronic device may display an icon indicating the progress by using the visual object 331 related to the bubble 333. In visual object 331, the first electronic device may visualize the progress by adjusting the length of an arc having a designated color. For example, the length of the arc may be gradually increased in proportion to the progress.

According to an embodiment, the first electronic device may receive an input for controlling transmission of the plurality of media contents based on the screen 330 displayed in a state of transmitting the plurality of media contents to the second electronic device. For example, the first electronic device may cease at least temporarily transmitting media contents, based on an input indicating that the visual object 331 related to the bubble 333 in screen 330 is selected.

As described above, according to an embodiment, the first electronic device may support transmission of media content selected by a user based on screens 310, 320, and 330 including a user interface based on a message application. The first electronic device may receive an input for at least partially controlling transmission of media contents. Hereinafter, referring to FIG. 4, in a state in which media contents are transmitted (e.g., a state in which the screen 330 is displayed), an operation performed by the first electronic device in response to an input for at least partially controlling transmission of media contents will be described.

Figure 4:
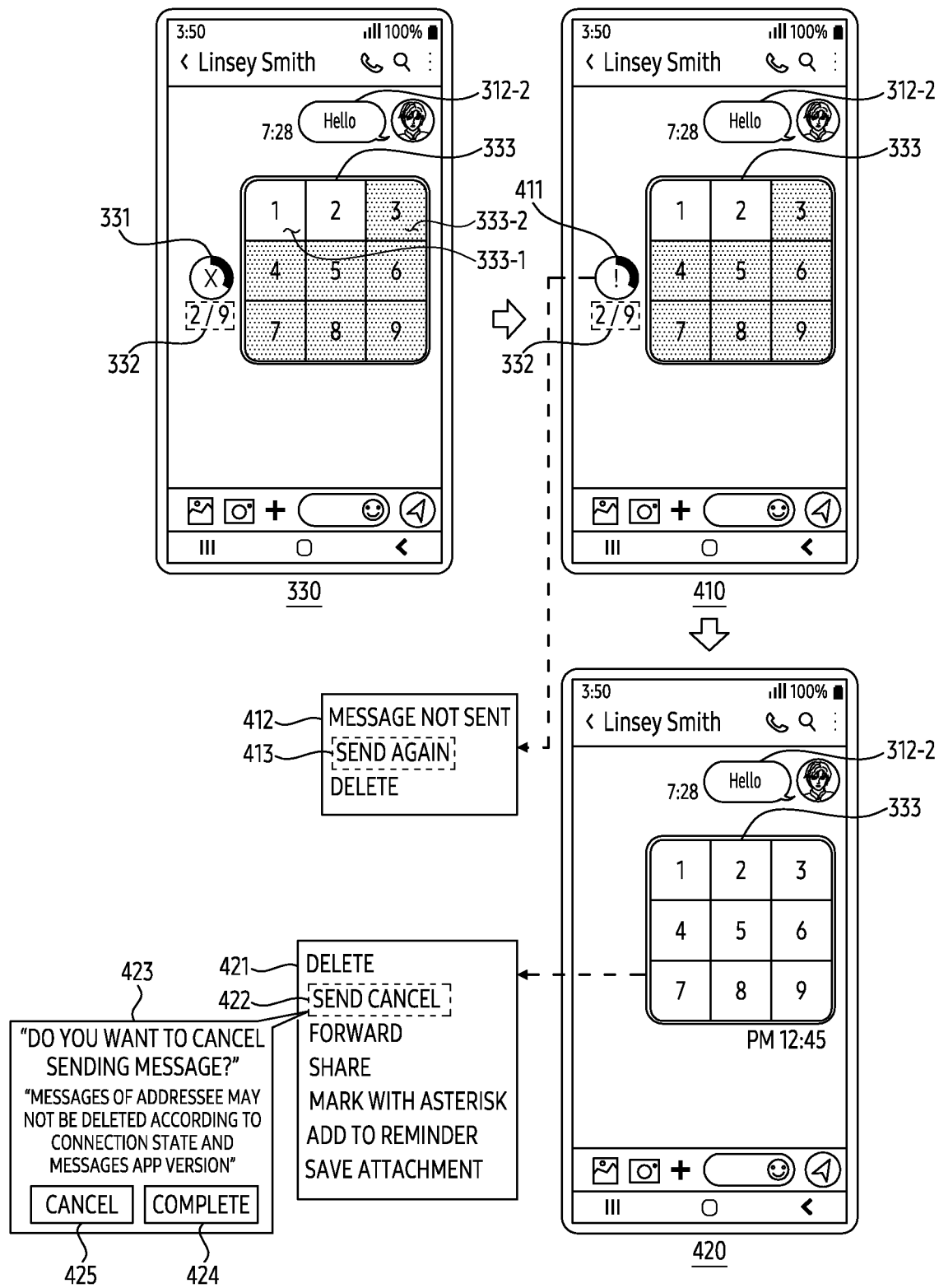
FIG. 4 illustrates exemplary screens displayed while a first electronic device individually controls transmission of media contents, according to an embodiment.

FIG. 4 illustrates exemplary screens 330, 410, and 420 displayed while a first electronic device individually controls transmission of media contents, according to an embodiment. The first electronic device of FIG. 4 may be an example of the first electronic device 210 of FIG. 2, and/or the first electronic device of FIG. 3. For example, the screen 330 of FIG. 4 may include the screen 330 of FIG. 3. Referring to FIG. 4, screens 330, 410, and 420 displayed by the first electronic device based on execution of a messenger application are illustrated. Hereinafter, in a state of transmitting nine media contents (e.g., images in which numbers 1 to 9 are captured), an operation performed by the first electronic device based on an input for controlling transmission of the media contents will be described.

Referring to FIG. 4, the first electronic device may display information related to transmission of the media contents while transmitting a group of media contents indicated by the bubble 333 in the screen 330. For example, the first electronic device may visualize the information by adjusting a tone of visual objects (e.g., thumbnails) that represent respectively media content integrated in the bubble 333. For example, before transmitting the first media content among the media contents to the external electronic device (e.g., the second electronic device 220 of FIG. 2), the first electronic device may display the first visual object representing the first media content of the visual objects within the bubble 333, in a first state in which a tone is adjusted. In the first state, the first visual object (e.g., thumbnail in the bubble 333, representing captured image of number 1) may be dimmed or faded based on a specified color (e.g., black, and/or gray). In the above example, after the first media content is transmitted to the external electronic device, the first electronic device may change the state of the first visual object from the first state to a second state different from the first state.

Referring to FIG. 4, in the bubble 333 of the screen 330, an example in which visual objects representing different media contents are displayed based on different states (e.g., the first state or the second state) is illustrated. For example, a visual object displayed based on the first state may be illustrated based on dots, such as a second visual object 333-2 that represents media content in which the number 3 is captured. For example, a visual object displayed based on the second state may be illustrated independently of the dots, such as a first visual object 333-1 that represents media content in which the number 1 is captured.

In an embodiment, displaying the first visual object representing the first media content in the first state may be performed independently of an operation in which a second visual object representing a second media content different from the first media content, among media contents displays, based on any one state of the first state or the second states. For example, the first electronic device may display the state of the second visual object representing the second media content based on any one state of the first state or the second states, independently of whether the first media content is transmitted to the external electronic device, based on whether the second media content is transmitted to the external electronic device. For example, the first electronic device may select a state of the first visual object 333-1 that represents the image in which the number 1 is captured within the bubble 333 from among the first state or the second state, independently of a state of the second visual object 333-2 that represents the image in which the number 3 is captured.

Referring to FIG. 4, a moment in which the screen 330 is displayed may be a moment after transmission of two media contents (e.g., captured images of numbers 1 to 2) among media contents is completed. The first electronic device may display visual objects that represent the two media contents in the bubble 333 of the screen 330, within the second state. The first electronic device may display visual objects that represents media contents different from the two media contents in the bubble 333 of the screen 330, within the first state. The first electronic device may display the visual object in the first state by overlapping a figure having a specified alpha value (e.g., an alpha value of less than 100%) on the visual object that represents media content. The alpha value of the figure may be gradually changed based on a progress of transmitting a message corresponding to media content. For example, the first electronic device may proportionally adjust the alpha value of the figure based on the ratio of the total size of the message including media content and the size of a part of the message transmitted to the second electronic device. The first electronic device may display the visual object in the first state by comprehensively changing colors of pixels in the visual object. The second state may be a state different from the first state, and may include, for example, a state in which the reduced media content is displayed without any distortion. For example, the second state may be a state different from the first state in which a distortion such as dimming is applied to the visual object representing media content.

In an embodiment, the first electronic device may display information (e.g., progress) related to transmission of media contents related to the bubble 333, by using the visual object 332 including text related to the bubble 333. For example, the information related to the transmission of the media contents may include the number (e.g., 9) of media contents included in the group. The information displayed by the visual object 332 may include the number (in a moment when the screen 330 is displayed, 2) of media contents in which transmission to the second electronic device within the group is completed. The first electronic device may gradually increase the numerical value included in the visual object 332 as the number of media contents transmitted to the second electronic device increases.

In an embodiment, information related to the transmission of media contents may be visualized based on an image, and/or an icon, as well as a form of text such as the visual object 332. Referring to FIG. 4, the first electronic device may display the information using the visual object 331 related to the bubble 333. Referring to FIG. 4, the visual object 331 may indicate a ratio of media content in which transmission to the second external electronic device is completed among media content represented by the bubble 333, based on the length of an arc formed on the outer periphery of a circular icon. The arc may have a color different from the color of the circular icon. According to an embodiment, the first electronic device may gradually increase the length of the arc within the visual object 331 in proportion to the ratio. For example, when all media contents are transmitted (i.e., when the ratio is 100%), the length of the arc may be matched the circumference of the icon.

According to an embodiment, the first electronic device may receive an input for controlling transmission of the media contents while transmitting media contents represented by the bubble 333. Referring to FIG. 4, in the screen 330, the visual object 331 may include a circular icon including text and/or an image indicating interruption of transmission of media contents, such as "x". The first electronic device may at least temporarily cease transmitting media contents to the second electronic device based on an input indicating that the visual object 331 is selected. The first electronic device may display visual objects (e.g., thumbnails of the media contents) that represent each of media content transmitted to the second electronic device in the bubble 333. The first electronic device may at least temporarily cease transmitting media content corresponding to the specific visual object to the second electronic device in response to an input indicating that the specific visual object displayed within the first state is selected.

Referring to FIG. 4, a screen 410 displayed by the first electronic device, after receiving an input indicating that the visual object 331 in the screen 330 is selected, is illustrated. For example, the screen 410 may be displayed in a state in which the first electronic device ceases transmitting media contents integrated in the bubble 333 in response to the input. In the screen 410, the first electronic device may visualize the interruption of transmission of media contents by using the visual object 411 adjacent to the bubble 333.

For example, the first electronic device may notify the user of the interruption of transmission of media content by using designated text (e.g., "!") included in the visual object 411. The position of the visual object 411 within the screen 410 may match the position of the visual object 331 within screen 330. For example, the first electronic device may display the screen 410 by changing the display of the visual object 331 after the transmission of media contents to the external electronic device (e.g., the second electronic device 220 of FIG. 2) is ceased by an input for selecting the visual object 331 in the screen 330. For example, the first electronic device may change the display of visual object 331 to receive an input for resuming transmission of media contents.

In an embodiment, in a state where the transmission of specified media contents by the bubble 333 is temporarily ceased, the first electronic device may receive an input for resuming transmission of the media contents. Referring to FIG. 4, while displaying the screen 410 based on the state, the first electronic device may receive an input indicating that the visual object 411 in the screen 410 is selected. In response to the input, the first electronic device may display a menu 412. The menu 412 may be overlapped at least a part of screen 410. In the menu 412, the first electronic device may display text (e.g., "message not transmitted") indicating that transmission of media contents is temporarily ceased. In the menu 412, the first electronic device may display an option (e.g., a button including text such as "deleting") for terminating transmission of media contents. In the menu 412, the first electronic device may display an option (e.g., a button 413 including text such as "send again") for resuming transmission of media contents.

Referring to FIG. 4, in response to an input indicating that the button 413 in the menu 412 is selected, the first electronic device may resume transmission of media contents indicated by the bubble 333. In a state in which transmission of the media contents is resumed, the first electronic device may display the progress of transmission of the media contents, as described above with reference to the screen 330. Referring to FIG. 4, the first electronic device may display the screen 420 in response to completion of transmission of media contents integrated in the bubble 333. For example, the screen 420 may be a screen displayed by the first electronic device in a state in which transmission of the media contents is completed.

Referring to the screen 420 of FIG. 4, after transmission of media contents is completed, the first electronic device may display visual objects (e.g., thumbnails) that represent media contents based on the second state in the bubble 333. The first electronic device together with the bubble 333 may display a time (e.g., "12:45 pm") at which media contents included in the bubble 333 are transmitted from the first electronic device.

In an embodiment, the first electronic device displaying the screen 420 may receive an input for executing functions related to the bubble 333. For example, the first electronic device may display the menu 421 for executing functions related to the bubble 333, based on a long-touch gesture for the bubble 333. The menu 421 may be displayed by overlapping on the screen 420 by the first electronic device. In the menu 421, the first electronic device may display an option (e.g., a button including text such as "delete") for deleting the bubble 333 and/or a message (e.g., a message including media contents) corresponding to the bubble 333, in the chat room corresponding to the screen 420. In the menu 421, the first electronic device may display an option (e.g., a button 422 including text such as "send cancel") for undoing the transmission of media contents in the bubble 333. In the menu 421, the first electronic device may display an option (e.g., a button including text such as "forward") for transmitting media contents in the bubble 333 to another chat room different from a chat room related to the screen 420. In the menu 421, the first electronic device may display an option (e.g., a button including text such as "share") for processing media contents in the bubble 333 based on another application different from the messenger application related to the screen 420. In the menu 421, the first electronic device may display an option (e.g., a button including text such as "mark with asterisk") for assigning a flag designated to the bubble 333. In the menu 421, the first electronic device may display an option (e.g., a button including text such as "add to reminder") for creating an alarm and/or a schedule related to the bubble 333. In the menu 421, the first electronic device may display an option (e.g., a button including text such as "Save Attachment") for downloading media contents in the bubble 333 to the first electronic device.

According to an embodiment, in the menu 421 related to the bubble 333, the first electronic device may identify an input indicating a recall of media contents in the bubble 333. In response to an input indicating that the button 422 in the menu 421 is selected, within a specified period (e.g., 5 minutes) after the bubble 333 is transmitted, the first electronic device may display a window 423 for identifying whether to recall media contents in the bubble 333 by overlapping on the screen 420. In the window 423, the first electronic device may display text (e.g., "Do you want to cancel sending message?", and/or "Messages of addressee may not be deleted according to connection state and Messages app version") for guiding the recall of media contents in the bubble 333. In the window 423, the first electronic device may display a button 424 for confirming the recall of media contents transmitted to different electronic devices (e.g., the electronic device 220 of FIG. 2 and/or the third electronic device 230), and a button 425 for canceling the recall of media contents. In response to an input indicating that the button 425 is selected, the first electronic device may cease displaying the window 423 independently of the recall of media contents related to the bubble 333.

Referring to FIG. 4, based on an input for selecting the button 424 within the window 423, the first electronic device may transmit a signal requesting recall of media contents in the bubble 333 to a server (e.g., the second electronic device 220 in FIG. 2) of messenger service related to the screen 420. Based on the signal, the server may transmit a signal for ceasing the display of the media contents to the terminal (e.g., the third electronic device 230 of FIG. 2) of addressee of the bubble 333. Based on receiving the signal, the terminal of the addressee of the bubble 333 may cease displaying another bubble corresponding to the bubble 333 of the first electronic device and displayed in the terminal. In an embodiment, the first electronic device may display the button 422 for a specified period (e.g., 5 minutes) after the bubble 333 is transmitted. Based on the expiration of the specified period, the first electronic device may cease displaying the button 422 in the menu 421. Based on the expiration of the specified period, the first electronic device may not transmit the signal requesting the recall of media contents to the server despite an input for selecting the button 424. For example, a function of recalling media contents in the bubble 333 from the messenger service may be executed for a specified period after media contents in the bubble 333 are transmitted.

As described above, according to an embodiment, the first electronic device may execute functions related to transmitting media contents as a group. The functions may be supported by a messenger application executed by the first electronic device. The functions may include a function of individually ceasing or terminating transmission of media contents. The functions may include a function of displaying the progress of media contents transmitted while media contents are simultaneously or sequentially transmitted from the first electronic device. For example, the first electronic device may represent whether each of the media contents is transmitted to another electronic device (e.g., the second electronic device 220 of FIG. 2 and/or the third electronic device 230) different from the first electronic device, based on a tone of visual objects representing each media content integrated by the bubble 333.

Hereinafter, an operation in which a terminal such as a first electronic device intensively displays a plurality of media contents in a bubble (e.g., the bubble 333 of FIGS. 3 to 4) based on a messenger application will be described.

Figure 5:
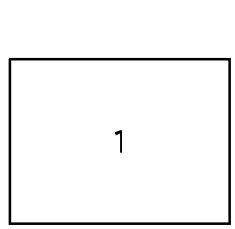
FIG. 5 illustrates exemplary visual objects that an electronic device displays based on execution of an application for exchanging messages, according to an embodiment.
Figure 5:
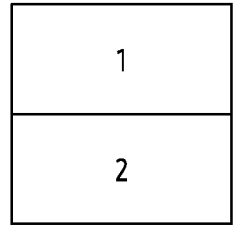
Figure 5:
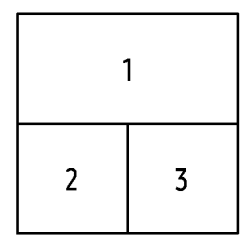
Figure 5:
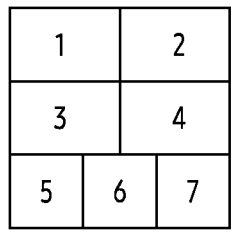
Figure 5:
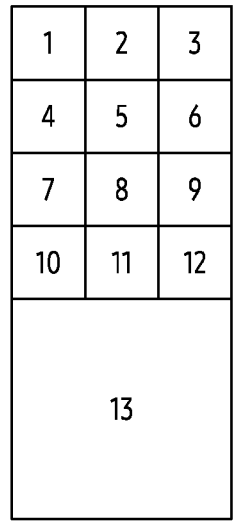

FIG. 5 illustrates exemplary visual objects 510, 520, 530, 540, 550, and 560 that an electronic device displays based on execution of an application for exchanging messages, according to an embodiment. The electronic device of FIG. 5 may be an example of a terminal (e.g., the first electronic device 210 and/or the third electronic device 230 of FIG. 2) for executing a messenger application.

Referring to FIG. 5, according to an embodiment, the electronic device illustrates visual objects 510, 520, 530, 540, 550, and 560 displayed on the screen to represent a group of at least one media content based on the messenger application. The visual objects 510, 520, 530, 540, 550, and 560 may be examples of bubbles displayed in the area 312 of FIG. 3. Referring to FIG. 5, the visual object 510 may represent an example of a bubble displayed by an electronic device to display one media content. Each of the width and height of the visual object 510 may correspond to the width and height of the media content corresponding to the visual object 510. For example, the width of the visual object 510 may be a reduced width of the media content based on a specified ratio. For example, the height of the visual object 510 may be a reduced height of the media content based on the specified ratio.

Referring to FIG. 5, the visual object 520 may represent an example of a bubble displayed by an electronic device to display two media contents. In the visual object 520, the electronic device may combine two media contents along the height direction. For example, the width of the visual object 520 may be a reduced width of any one of the two media contents based on a specified ratio, when the widths of the two media contents match. For example, the height of the visual object 520 may be the sum of reduced heights obtained by applying the specified ratio to the sum of the heights of two media contents.

Referring to FIG. 5, the visual object 530 may represent an example of a bubble displayed by an electronic device to display three media contents. In the visual object 530, the electronic device may jointly display the three media contents so that the combination of the three media contents forms a rectangular outline. For example, in the visual object 530, the width of the thumbnail that represents the first media content among the three media contents may match the sum of the widths of the thumbnails that represent other media contents.

Referring to FIG. 5, a visual object 540 displayed by an electronic device is illustrated to display seven media contents. Similar to visual objects 530 and 540, in the visual object 540, the electronic device may enlarge or reduce seven media contents so that the seven media contents have a rectangular outline within the visual object 540.

Referring to FIG. 5, according to an embodiment, the electronic device may display the group based on the layout of the visual object 550 in order to display 13 media contents as a group. The electronic device may adjust the width of 12 media contents among the 13 media contents to the same width. Based on the same width, the electronic device may arrange the 12 media contents in the form of a matrix (e.g., a matrix of FIG. 3 having four rows and three columns). The embodiment is not limited to the matrix of FIG. 3. The electronic device may display a specific media content excluding the 12 media contents among the 13 media contents, based on a width adjusted to three times the same width within the visual object 550. In a state in which the electronic device displays more than 13 media contents, an area in the visual object 550 in which the specific media content is displayed may guide an area in which media contents of an order exceeding 13 within the order of the media contents are disposed, in the order of the media contents.

As described above, according to an embodiment, when a plurality of media contents are displayed in a single bubble, such as visual objects 520, 530, 540, 550, and 560, the electronic device may reduce the plurality of media contents in the single bubble so that outlines of the plurality of media contents formed in the single bubble have a rectangular shape. In an embodiment, the electronic device displaying a plurality of media contents within a single bubble may be performed based on a flexbox layout.

According to an embodiment, the number of media contents that the electronic device may transmit in a single group based on the messenger application may be limited to a designated upper limit or less. The designated upper limit may be set by a messenger service corresponding to the messenger application and/or a network. For example, the designated upper limit may be but the embodiment is not limited thereto. The visual object 560 of FIG. 5 may represent an example of a bubble displayed by an electronic device in order to display media content of the designated upper limit. In an embodiment, when generating a group including media contents exceeding numbers of the designated upper limit, the electronic device may display the media contents, using bubbles where a number of the bubbles equals to a quotient obtained by dividing the number of media contents in the group based on the designated upper limit. For example, when a designated upper limit is 30, and the electronic device generates a group including 50 media contents, the electronic device may display the 50 media contents by using two bubbles. For example, when media contents exceeding numbers of the designated upper limit are received through messages with matching identifiers, the electronic device may distribute the media contents to one or more bubbles based on a quotient obtained by dividing the number of media contents by the designated upper limit.

In an embodiment, the server (e.g., the second electronic device 220 of FIG. 2) connected to the electronic device may add information indicating that the plurality of media contents are a group to each of the messages including each of the plurality of media contents to the electronic device, so that the electronic device displays a plurality of media contents such as visual objects 520, 530, 540, 550, and 560 in a single bubble. The information may indicate a moment at which an input (e.g., an input including a gesture of touching and/or clicking the visual object 321 in FIG. 3) indicating transmission of the plurality of media contents as a group is received. The electronic device receiving the plurality of messages may determine whether to display media contents included in the plurality of messages as a group, based on whether the information added to the plurality of messages matches each other. Hereinafter, referring to FIGS. 6 to 7, according to an embodiment, an operation in which the electronic device displays a plurality of media contents included in a plurality of messages as a group in response to the reception of the plurality of messages will be described.

Figure 6:
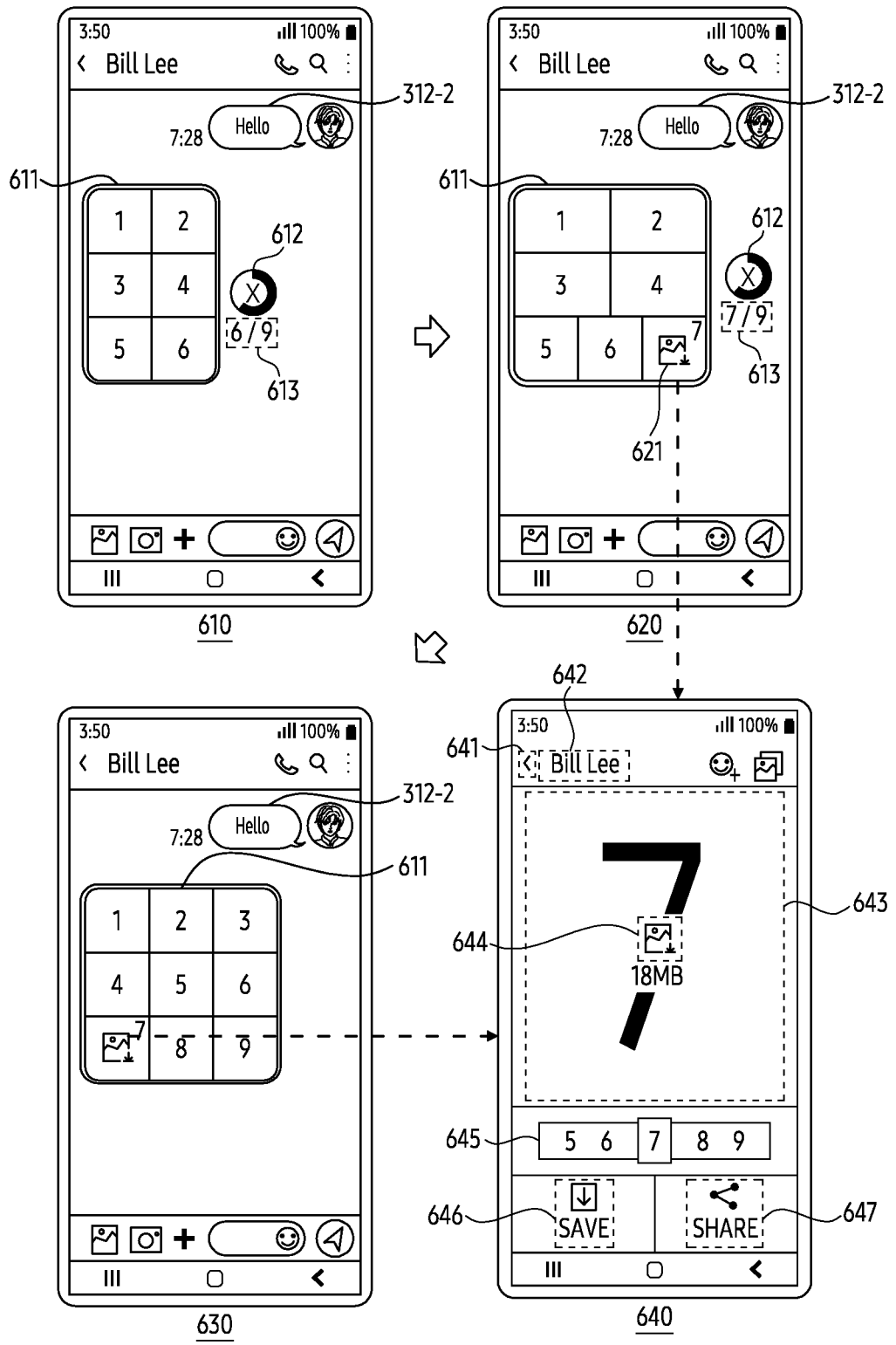
FIG. 6 illustrates exemplary screens displayed by a third electronic device and for receiving media contents, according to an embodiment.

FIG. 6 illustrates exemplary screens 610, 620, 630, and 640 displayed by a third electronic device and for receiving media contents, according to an embodiment. The third electronic device of FIG. 6 may be an example of the third electronic device 230 of FIG. 2. For example, the screens 610, 620, 630, and 640 of FIG. 6 may be output through the display module 160 of the third electronic device 230 of FIG. 2. Referring to FIG. 6, the screens 610, 620, 630, and 640 provided by the third electronic device to a user in a state in which media content exchange based on a message is performed are illustrated. For example, based on the reception of messages including different media contents, the third electronic device may display any one of the screens 610, 620, and 630.

Referring to FIG. 6, according to an embodiment, the third electronic device may receive a plurality of messages from an external electronic device (e.g., the second electronic device 220 in FIG. 2) to transmit different media contents generated by another external electronic device (e.g., the first electronic device 210 in FIG. 2) different from the external electronic device as a group. Each of the plurality of messages may include information for indicating the group. The information may include an identifier (e.g., a key value and/or a collection label) for indicating that the plurality of messages are included in the group. The information may include number of media contents included in the group. Hereinafter, it is assumed that the third electronic device receives at least one of a plurality of messages (e.g., nine messages) having an identifier indicating a group including nine media contents.

According to an embodiment, the third electronic device may receive a plurality of messages from an external electronic device. The third electronic device may output a message (e.g., pop-up window, notification sound, or vibrations) notifying the reception of a message based on receiving at least one of a plurality of messages. The number of times that the third electronic device outputs the message may match or differ from the numbers of a plurality of messages. Based on whether a plurality of received messages are included in a group of a plurality of media contents, the third electronic device may determine whether to display a plurality of media contents included in each of the plurality of messages in a single bubble. For example, when a plurality of messages include a common key value, the third electronic device may display a plurality of media contents included in each of the plurality of messages in a single bubble.

The screen 610 of FIG. 6 may be displayed by the third electronic device while the reception of six media contents among the nine media contents in the group according to the assumption is completed from the external electronic device (e.g., the second electronic device 220 of FIG. 2). The third electronic device may reduce and display the six media contents in the visual object 611 representing one bubble of the screen 610. For example, the third electronic device may display thumbnails of the six media contents in the visual object 611. The screen 610 of the third electronic device may be related to a chat room including a sender (e.g., a user of the first electronic device 210 in FIG. 2) of media contents according to the assumption and a user of the third electronic device. The third electronic device may display the visual object 611 adjacent to the left side of the screen 610 in order to indicate that one or more media contents indicated by the visual object 611 are transmitted by the sender of the chat room. However, the embodiment is not limited thereto.

Referring to the screen 610 of FIG. 6, according to an embodiment, the third electronic device may display at least one of visual objects 612 and 613 for indicating progress of reception of nine media contents based on the group, adjacent to the visual object 611 for representing a group of six media contents. According to an embodiment, the display of the visual objects 612 and 613 may be selectively omitted. For example, the third electronic device may display numerical values indicating the number (on the above assumption, 9) of all media contents included in the group and the number (in the moment that the screen 610 is displayed, 6) of media contents received by the third electronic device among the media contents in the group, together with the visual object 613. For example, the third electronic device may visualize the progress based on the length of an arc formed along the circumference of a circular icon, and having a designated color (e.g., blue), such as the visual object 612. Adjusting the length of the arc in the visual object 612 based on the reception of the media contents in the group by the third electronic device may be performed similarly to adjusting the length of the arc in the visual object 331 of FIG. 3.

Referring to FIG. 6, in a state (e.g., a state in which the screen 610 is displayed) in which six media contents among nine media contents within the group on the assumption are received, the third electronic device may display the screen 620 based on the additional completion of reception of one media content. Referring to the screen 620 of FIG. 6, the third electronic device may display the seven media contents in the visual object 611 by reducing or enlarging based on a layout illustrated based on the visual object 540 of FIG. 5, in order to display seven media contents in the visual object 611 based on the additional completion. While the screen 610 is switched to the screen 620, the third electronic device may play an animation such as movement of media contents in the visual object 611 and/or enlargement of the visual object 611, based on the increase in the number of media contents displayed in visual object 611. Based on the increase in the number of media contents, the third electronic device may update the text displayed in the visual object 613 based on the increased number of media contents. Based on the increase in the number of media contents, the third electronic device may adjust the length of the arc within the visual object 612.

According to an embodiment, the third electronic device may perform reception of each of the media contents based on different modes. For example, the first mode (e.g., the incoming mode) may indicate that the third electronic device identifies transmission of media content by an external electronic device. For example, the second mode (e.g., progress mode) may indicate that the third electronic device is receiving media content through the external electronic device. For example, the third mode (e.g., complete mode) may indicate that the third electronic device is completed receiving media content through the external electronic device. For example, while displaying the screen 610, six media contents displayed within the visual object 611 may be included in the third mode, and three media contents except for the six media contents may be included in any one of the first mode and the second mode on the above assumption.

Referring to the screen 620 of FIG. 6, according to an embodiment, the third electronic device may manage the identified at least one media content based on the first mode among the exemplified modes, based on identifying at least one media content having a size exceeding a specified threshold size among media contents, on the above assumption. For example, on the above assumption, the third electronic device may temporarily cease receiving a specific image based on identifying that the size of the specific image where the number 7 is captured exceeds the specified threshold size. Temporarily ceasing the reception of the specific image by the third electronic device may be changed based on the type of network to which the third electronic device is connected. In the above example, the third electronic device may resume receiving the specific image in response to identifying a connection to a network based on the Wi-Fi protocol. In the above example, when connected through a cellular network such as an LTE protocol, the third electronic device may conditionally resume reception of the specific image based on receiving an input for resuming reception of the specific image from a user. In the visual object 611, the third electronic device may overlap and display an icon 621 indicating that the specific image exceeds the specified threshold size on a thumbnail representing the specific image. The icon 621 may indicate that reception of the specific image exceeding the specified threshold size is at least temporarily ceased. For example, the specified threshold size may be 10 megabytes (MB). However, the specified threshold size is not limited to the above example.

Referring to FIG. 6, on the above assumption, a screen 630 displayed by a third electronic device in a state in which all media contents included in the group are received is illustrated. Displaying the screen 630 by the third electronic device may indicate that all media contents except at least one media content (e.g., an image captured with a number 7) exceeding a specified threshold size, among the media contents in the group, are included in the third mode. In the screen 630, the third electronic device may intensively display nine media contents in the group within the visual object 611. In response to an input indicating that the visual object 611 is selected, the third electronic device may enter a state for individually displaying media contents included in the visual object 611.

Referring to FIG. 6, the third electronic device may display a screen 640, based on an input indicating that the visual object 611 is selected. In the screen 640, the third electronic device may display the visual object 641, such as a button for returning to another screen displayed before the screen 640. The third electronic device may display a visual object 642 for describing media content displayed by the screen 640 in the screen 640. In the visual object 642, the third electronic device may display at least one of a date, time, place, name of which media content in the screen 640 is captured, or a user who captures the media content. The third electronic device may display one media content in the area 643 of the screen 640. The third electronic device may display a visual object 646 for executing a function for storing media content displayed in the area 643 of the screen 640. The third electronic device may display a visual object 647 for executing a function for sharing media content displayed in the area 643 of the screen 640 with another application different from the messenger application.

In an embodiment, in the area 645 within the screen 640, the third electronic device may display thumbnails that represent each of the media contents in the group specified by the visual object 611 selected by the input. In response to an input indicating that any one of the thumbnails is selected, the third electronic device may display media content corresponding to the thumbnail selected by the input in the area 643 within the screen 640. Referring to FIG. 6, an exemplary state in which a specific image (e.g., an image in which a number 7 is captured) exceeding a specified threshold size is displayed in the area 643 of screen 640 among the media contents in the visual object 611 is illustrated. Based on identifying that the specific image is included in the first mode, the third electronic device may notify that reception of the specific image is ceased by using an icon 644 overlapping on the area 643. The third electronic device may display text (e.g., 18 MB) indicating the size of the specific image, together with the icon 644. In response to an input indicating that the icon 644 is selected, the third electronic device may download the specific image from the external electronic device (e.g., the second electronic device 220 of FIG. 2). Based on the download, the third electronic device may completely receive the specific image exceeding a specified threshold size.

As described above, according to an embodiment, the third electronic device may individually display a state in which the plurality of media contents are received in a state in which the plurality of media contents are received as a group. According to an embodiment, the third electronic device may support ceasing the reception of the plurality of media contents using the visual object 612 of FIG. 6, independently of individually displaying a state in which the plurality of media contents are received. Hereinafter, referring to FIG. 7, according to an embodiment, an operation in which the third electronic device at least temporarily ceases receiving a plurality of media contents will be described.

Figure 7:
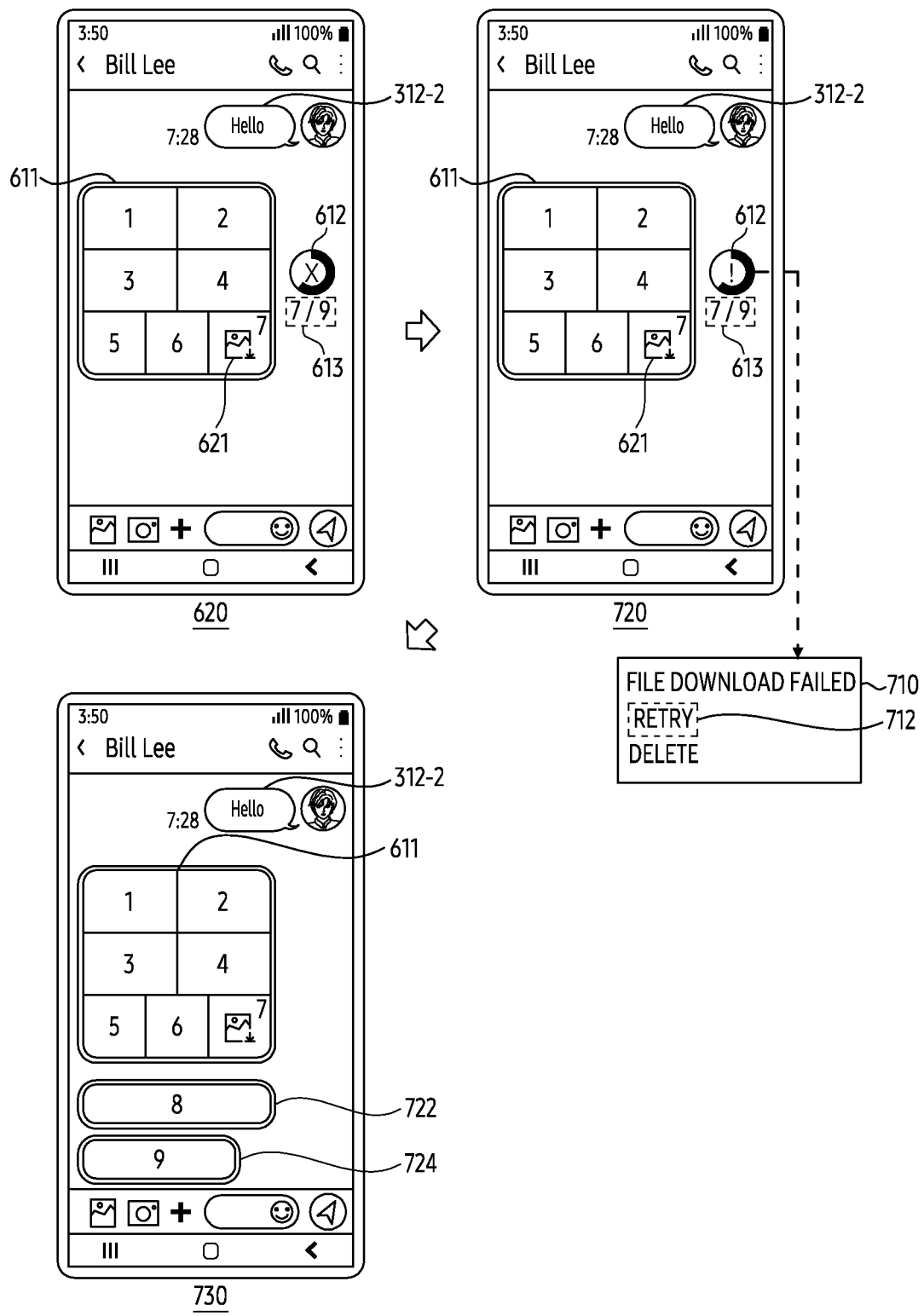
FIG. 7 illustrates exemplary screens displayed while a third electronic device ceases and/or resumes receiving media content, according to an embodiment.

FIG. 7 illustrates exemplary screens displayed while a third electronic device ceases and/or resumes receiving media content, according to an embodiment. The third electronic device of FIG. 7 may be an example of the third electronic device 230 of FIG. 2 and/or the third electronic device of FIG. 6. For example, the screen 620 of FIG. 7 may include the screen 620 of FIG. 6. Referring to FIG. 7, screens 620, 720, and 730 displayed by the third electronic device based on execution of a messenger application are illustrated. Hereinafter, it is assumed that the third electronic device receives a plurality of messages to which identifiers indicating a group including nine media contents are commonly allocated from an external electronic device (e.g., a server such as the second electronic device 220 of FIG. 2).

Referring to FIG. 7, in a state in which 7 media contents are received among 9 media contents based on a plurality of messages on the above assumption, the third electronic device according to an embodiment may display a screen 620. The third electronic device may obtain an input for ceasing reception of media contents by using the visual object 612 in the screen 620. For example, in response to an input indicating that the visual object 612 is selected, the third electronic device may cease receiving media contents. In response to the input, the third electronic device may display a screen 720.

Referring to FIG. 7, in the screen 720, the third electronic device may notify the interruption of reception of media content related to the visual object 611 by changing the display of the visual object 612 displayed adjacent to the visual object 611. For example, the third electronic device may notify the interruption of reception of the media contents, by displaying the designated text (e.g., "!") within the visual object 612. In a state in which the screen 720 is displayed, the third electronic device may not display media contents (e.g., at least one media content not displayed in the visual object 611 in the group, on the above assumption) received from the external electronic device (e.g., the second electronic device 220 of FIG. 2) within the screen 720. For example, after receiving an input indicating that the reception of media contents is ceased, the third electronic device may refrain from displaying additionally received media contents in the screen 720.

According to an embodiment, the third electronic device may receive an input for resuming reception of media content related to the visual object 611 based on the visual object 612 in the screen 720. For example, in response to an input indicating that visual object 612 is selected, the third electronic device may overlap the window 710 on the screen 720. In the window 710, the third electronic device may display an option (e.g., a visual object 712 such as a button including designated text such as "retry") for resuming reception of the media contents. In the window 710, the third electronic device may display an option (e.g., a visual object such as a button including designated text such as "delete") for ceasing display of the visual object 611. The third electronic device may resume receiving media contents in response to an input indicating that the visual object 712 in the window 710 is selected.

According to an embodiment, the third electronic device may request the external electronic device (e.g., the second electronic device 220 of FIG. 2) to transmit the media contents in order to resume reception of the media contents. For example, the third electronic device may transmit information for resuming reception of media contents to the external electronic device, in response to an input indicating that visual object 712 is selected. For example, the information may include information for distinguishing media contents displayed in the visual object 611 from other media contents, among groups of media contents. For example, the information may include an identifier of the media contents included in the visual object 611. The information may be used to transmit the other media contents by an external electronic device.

According to an embodiment, the third electronic device may receive a plurality of messages including each of media contents included in a group based on a time interval. The time interval may be referred to as a guard time. The time interval may be set for transmission of a plurality of messages related to the group between a third electronic device and an external electronic device (e.g., a server such as the second electronic device 220 in FIG. 2). Based on the expiration of the time interval, the third electronic device may cease adding media content to the group in which the media contents are intensively displayed, independently of the numbers (e.g., on the above assumption, 9) of media content allocated to each of the plurality of messages. For example, although at least one media content included in the group is additionally received after the expiration of the above time interval, the third electronic device may display the at least one media content by using a bubble different from the bubble (e.g., the visual object 611) matching the group.

In an embodiment, the third electronic device may obtain a time interval based on at least one of a key value commonly allocated to a plurality of messages in the group or numbers of media contents included in the group. For example, beginning moment of the time interval may be a moment represented by the key value. For example, the beginning moment may be a moment that has received an input indicating that a group of media contents is transmitted. For example, the length of the time interval may be a multiplication between the number of media contents and a designated period. For example, when the designated period is 10 seconds, on the above assumption, the third electronic device may obtain a time interval having a length of 90 seconds (e.g., 10 seconds×9).

According to an embodiment, while displaying a plurality of media contents as a group based on one bubble such as the visual object 611, the third electronic device may display at least one media content included in the group but received after the expiration of the time interval in another visual object different from the visual object 611, based on the expiration of the time interval for receiving the group. Referring to FIG. 7, in response to an input indicating that the visual object 712 is selected after the expiration of the time interval, the third electronic device may display media content additionally received from the external electronic device in a visual object (e.g., visual objects 722 and 724) different from the visual object 611, such as the screen 730. For example, visual objects 722 and 724 may be displayed adjacent to the left side of the screen 730 similar to the visual object 611. Each of the visual objects 722 and 724 may be displayed by a third electronic device in the group on the above assumption, in order to individually display two media contents excluding seven media contents received within the time interval.

As described above, according to an embodiment, in a state in which one group of a plurality of media contents is received based on a plurality of messages, the third electronic device may receive an input indicating that the reception of the plurality of media contents is at least temporarily ceased. The third electronic device may receive a plurality of messages based on a time interval (e.g., guard time) to prevent permanent waiting for the plurality of messages. For example, when the time interval expires before receiving all of the plurality of messages, the third electronic device may cease displaying the visual object for notifying progress of reception of the plurality of messages, such as visual objects 612 and 613.

The UI displayed in a state in which the third electronic device receives a plurality of messages is not limited to an embodiment of FIGS. 6 to 7. For example, in a state of receiving a plurality of messages grouped to display in a single bubble, the third electronic device may receive reduced information (e.g., thumbnails corresponding to each of the media contents) of each of the media contents included in the plurality of messages. The third electronic device may display a bubble based on the reduced information. After receiving the reduced information, the third electronic device may sequentially receive media contents based on the plurality of messages. Based on the sequential reception of the media contents, the third electronic device may adjust a tone and/or alpha value of the thumbnail in a bubble.

Hereinafter, referring to FIG. 8, an operation in which a terminal such as a third electronic device obtains an individual response of a user to each of media contents included in a group based on a messenger application is described.

Figure 8:
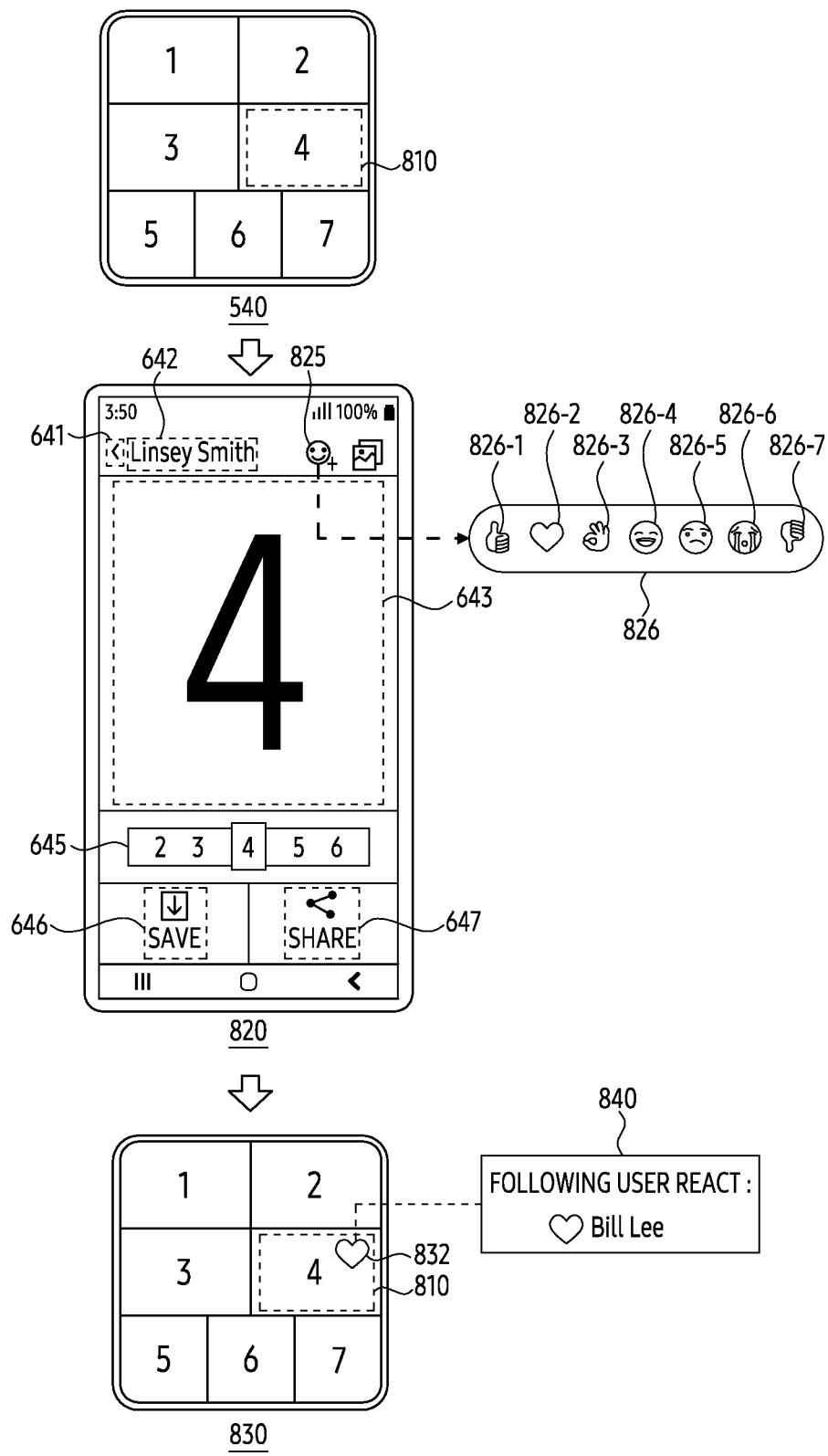
FIG. 8 illustrates an exemplary screen displayed by an electronic device to receive a reaction regarding a media content included in a message based on execution of an application for exchanging messages, according to an embodiment.

FIG. 8 illustrates an exemplary screen 820 displayed by an electronic device to receive a reaction regarding a media content included in a message based on execution of an application for exchanging messages, according to an embodiment. The electronic device of FIG. 8 may be an example of a terminal (e.g., the first electronic device 210 and/or the third electronic device 230 of FIG. 2) for executing a messenger application. For example, the screen 820 of FIG. 8 may include the screen 640 of FIG. 6. For example, visual objects 641, 642, 646, and 647 in the screen 820 of FIG. 8 may correspond to the visual objects 641, 642, 646, and 647 of FIG. 6.

Referring to FIG. 8, according to an embodiment, the electronic device may display the screen 820 in response to an input selecting the visual object 540 such as a bubble. The visual object 540 of FIG. 8 may include the visual object 540 of FIG. 5. As described above with reference to FIGS. 3 to 7, the electronic device may intensively display media contents in a group within the visual object 540. For example, an image representing each of the media contents, such as the thumbnail 810, may be included in the visual object 540. The visual object 540 may be commonly displayed on screens of electronic devices (e.g., the first electronic device 210 and the third electronic device 230 of FIG. 2) that transmit or receive media content included in the visual object 540.

Referring to FIG. 8, according to an embodiment, in the screen 820, the electronic device may display a visual object 825 for receiving a user's reaction regarding media content displayed in the screen 820. In response to an input indicating that the visual object 825 is selected, the electronic device may overlap the window 826 on the screen 820. The window 826 may include icons 826-1, 826-2, 826-3, 826-4, 826-5, 826-6, and 826-7 that represent the user's reaction based on emotion. The embodiment is not limited by icons 826-1, 826-2, 826-3, 826-4, 826-5, 826-6, and 826-7 included in the window 826.

In response to an input indicating that any one of the icons 826-1, 826-2, 826-3, 826-4, 826-5, 826-6, or 826-7 is selected, the electronic device may store a user's reaction indicated by the input in metadata of media content in the screen 820. In response to the input, the electronic device may transmit a user's reaction indicated by the input to another electronic device in which media content in the screen 820 is shared. In response to the input, the electronic device may display a user's reaction indicated by the input in a bubble corresponding to the media content in the screen 820. Although an embodiment of receiving an input indicating that any one of the icons 826-1, 826-2, 826-3, 826-4, 826-5, 826-6, or 826-7 is selected is described, the embodiment is not limited thereto. The electronic device may receive an input indicating that a plurality of icons are selected from among icons 826-1, 826-2, 826-3, 826-4, 826-5, 826-6, and 826-7. The electronic device may transmit information indicating a plurality of icons selected by the input to the other electronic device.

Referring to FIG. 8, according to an embodiment, in the screen 820 on which media content (e.g., an image in which the number 4 is captured) corresponding to the thumbnail 810 is displayed, a visual object 830, such as one bubble, displayed after receiving an input indicating that the electronic device selects the icon 826-2 is illustrated. In the visual object 830, the electronic device may overlap an icon 832 indicating a user's reaction indicated by the icon 826-2 on the thumbnail 810 of the media content corresponding to the input. Since the electronic device transmits the user's reaction indicated by the input to another electronic device shared with the media content, the other electronic devices may also display the icon 832 in the visual object 830.

According to an embodiment, the electronic device may display a user's reaction to each of one or more media contents included in the visual object 830. For example, in response to an input indicating that thumbnail 810 and/or icon 832 in the visual object 830 is selected, the electronic device may display the visual object 840 that is a pop-up window. In the visual object 840, the electronic device may display text (e.g., the user's name) indicating a user who inputs a reaction corresponding to the icon 832. For example, the electronic device may display a list of users responding to media content (e.g., media content corresponding to the thumbnail 810) corresponding to the visual object 840, by using the visual object 840.

As described above, according to an embodiment, in a state in which a plurality of media contents are displayed as a group, the electronic device may individually obtain a user's reaction regarding each of the plurality of media contents. The electronic device may transmit the reaction obtained to another electronic device in which the plurality of media contents are shared. Since the reaction is transmitted, an individual reaction of the user regarding the plurality of media contents in the group may be synchronized between the electronic device and the other electronic device.

Hereinafter, referring to FIGS. 9 to 13, operations of a terminal and a server described above will be described based on a flowchart.

Figure 9:
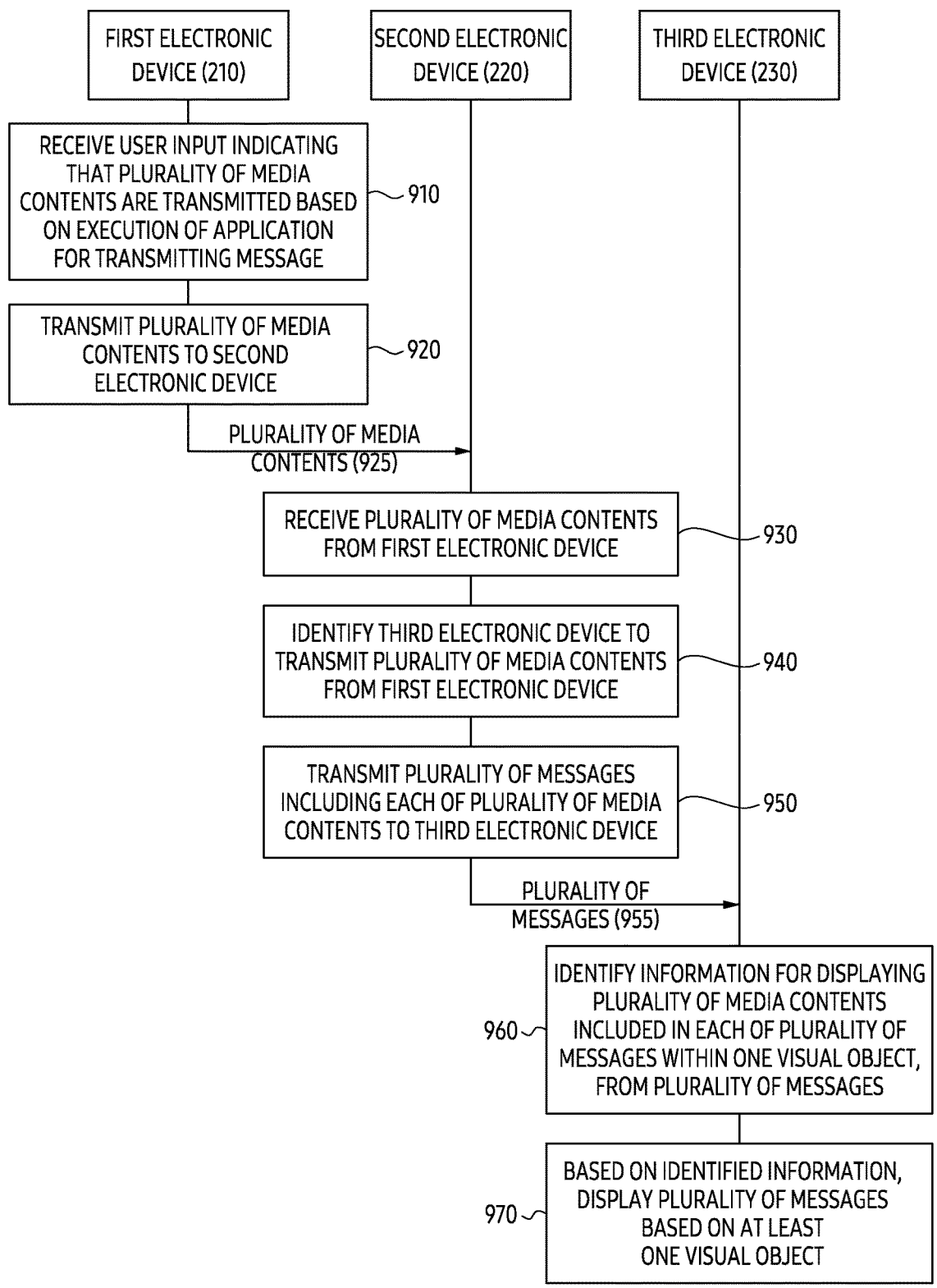
FIG. 9 illustrates an example of a signal flowchart between a first electronic device to a third electronic device according to an embodiment.

FIG. 9 illustrates an example of a signal flowchart between a first electronic device to a third electronic device according to an embodiment. The first electronic device 210, the second electronic device 220, and the third electronic device 230 of FIG. 9 may be examples of each of the first electronic device 210, the second electronic device 220, and the third electronic device 230 of FIG. 2.

Referring to FIG. 9, in operation 910, according to an embodiment, the first electronic device 210 may receive a user input indicating that a plurality of media contents are transmitted based on the execution of an application (e.g., a messenger application) for transmitting a message. The plurality of media contents may be selected from among media contents stored in the first electronic device 210, by a screen (e.g., the screen 310 of FIG. 3) displayed by the messenger application, a screen (e.g., the screen 340 of FIG. 3) displayed by another application of the first electronic device 210 different from the messenger application, and interaction between users. The user input may include a user input indicating that the visual object 321 of FIG. 3 is selected. In response to the user input, the first electronic device 210 may obtain a moment that is received the user input. As shown in the screen 320 of FIG. 3, the user input may be provided by a messenger application executed by the first electronic device 210 and may be related to a chat room for exchanging a message with another user of the third electronic device 230.

Referring to FIG. 9, in operation 920, according to an embodiment, the first electronic device 210 may transmit a plurality of media contents 925 to the second electronic device 220. For example, the first electronic device 210 may transmit the plurality of media contents 925 to the second electronic device 220 based on the execution of an application (e.g., an application of operation 910). In response to a user input of operation 910, the first electronic device 210 may transmit a plurality of media contents to the second electronic device 220. The first electronic device 210 may transmit information indicating a moment receiving a user input, and a plurality of messages including each of the plurality of media contents to the second electronic device 220. The screen 330 of FIG. 3 may be an example of a screen displayed while the first electronic device 210 transmits a plurality of media contents 925 based on operation 920.

According to an embodiment, in the user interface where the plurality of media contents are displayed by the third electronic device 230, the first electronic device 210 may add information to be displayed in a bubble to each of the plurality of messages transmitted to the second electronic device 220. The information may include a key value based on the moment receiving the user input of operation 910. For example, the information may include numbers of the plurality of media contents in the plurality of messages. For example, the first electronic device 210 may obtain the information to be included in the plurality of messages by encoding each of the names of files corresponding to the plurality of media contents based on information indicating the moment receiving the user input and information indicating the number of the plurality of media contents.

Referring to FIG. 9, in operation 930, according to an embodiment, the second electronic device 220 may receive the plurality of media contents 925 from the first electronic device. The second electronic device 220 may obtain the plurality of media contents 925 based on messages received from the first electronic device. For example, the second electronic device 220 may receive the plurality of media contents from the first electronic device 210, together with information on a user input indicating that the plurality of media contents are transmitted. The information may indicate a moment in which a visual object for transmitting the plurality of media contents is selected by a user input, in the user interface displayed within the display of the first electronic device and for transmitting messages.

While receiving the plurality of media contents 925 based on operation 930, the second electronic device 220 may transmit a signal indicating that reception of each of the plurality of media contents 925 is completed to the first electronic device 210. For example, the second electronic device 220 may transmit a signal for switching a state of the visual object, which is displayed on the first electronic device 210 and representing the first media content, from the first state in which the tone and/or alpha value is adjusted to a second state, based on receiving the first media content among the plurality of media contents 925 from the first electronic device 210, to the first electronic device 210. The signal may include an acknowledgement signal for any one of a plurality of messages including each of the plurality of media contents 925.

Referring to FIG. 9, in operation 940, according to an embodiment, the second electronic device 220 may identify the third electronic device 230 to transmit the plurality of media contents 925 from the first electronic device 210. The second electronic device 220 may identify the third electronic device 230 from messages including the plurality of media contents 925.

Referring to FIG. 9, in operation 950, according to an embodiment, the second electronic device 220 may transmit the plurality of messages 955 including each of the plurality of media contents to the third electronic device. Based on the reception of the plurality of media contents 925, the second electronic device 220 may transmit the plurality of messages 955 including information indicating a moment receiving a user input of operation 910 and information indicating the number of the plurality of media contents 925, and including each of the plurality of media contents 925, to the third electronic device 230. Information indicating the moment receiving the user input may be commonly allocated to the plurality of messages 955 to display the plurality of media contents in a bubble.

Referring to FIG. 9, in operation 960, according to an embodiment, the third electronic device 230 may identify information for displaying the plurality of media contents included in each of the plurality of messages within one visual object (e.g., bubble) from the plurality of messages 955. The third electronic device 230 may perform operation 960 in response to reception of at least one of the plurality of messages 955. Referring to FIG. 9, in operation 970, according to an embodiment, based on the identified information, the third electronic device 230 may display the plurality of messages 955 and/or the plurality of media contents included in the plurality of messages 955 based on at least one visual object (e.g., bubble). Displaying intensively media contents included in the plurality of messages 955 within a single visual object by the third electronic device 230 may be performed, based on a time interval (e.g., the guard time described above with reference to FIG. 7) obtained by the information identified based on operation 960.

According to an embodiment, the third electronic device 230 may execute a function for at least one of a plurality of media contents included in the plurality of messages 955 after receiving a plurality of messages 955. For example, the third electronic device 230 may receive an input for requesting retransmission of at least one media content, such as an input indicating that the visual object 712 of FIG. 7 is selected. In response to the input, the third electronic device 230 may transmit a signal notifying the reception of a user input requesting at least one media content among a plurality of media contents, to the second electronic device 220. In response to the signal, the second electronic device 220 may retransmit at least one message for the at least one media content to the third electronic device 230. The at least one message may further include information indicating moment receiving the user input of operation 910 and information indicating the number of the plurality of media contents.

According to an embodiment, after receiving the plurality of messages 955, the third electronic device 230 may obtain a reaction of the user of the third electronic device 230 to at least one of a plurality of media contents included in the plurality of messages 955. Similarly, after transmitting the plurality of media contents 925 based on operation 920, the first electronic device 210 may obtain a reaction of the user of the first electronic device 210 to at least one of the plurality of media contents 925. The first electronic device 210 and the third electronic device 230 may share a user's reaction obtained by each of the first electronic device 210 and the third electronic device 230 to the third electronic device 230 and the first electronic device 210. For example, the first electronic device 210 may transmit a reaction to at least one of the plurality of media contents 925 obtained from a user of the first electronic device 210 through the second electronic device 220, to the third electronic device 230. In response to the reception of the message indicating the reaction, the third electronic device 230 may display an icon indicating the reaction by overlapping at least one media content related to the reaction.

Hereinafter, referring to FIG. 10, an operation of the first electronic device 210 related to operations 910, 920, and 930 of FIG. 9 will be described.

Figure 10:
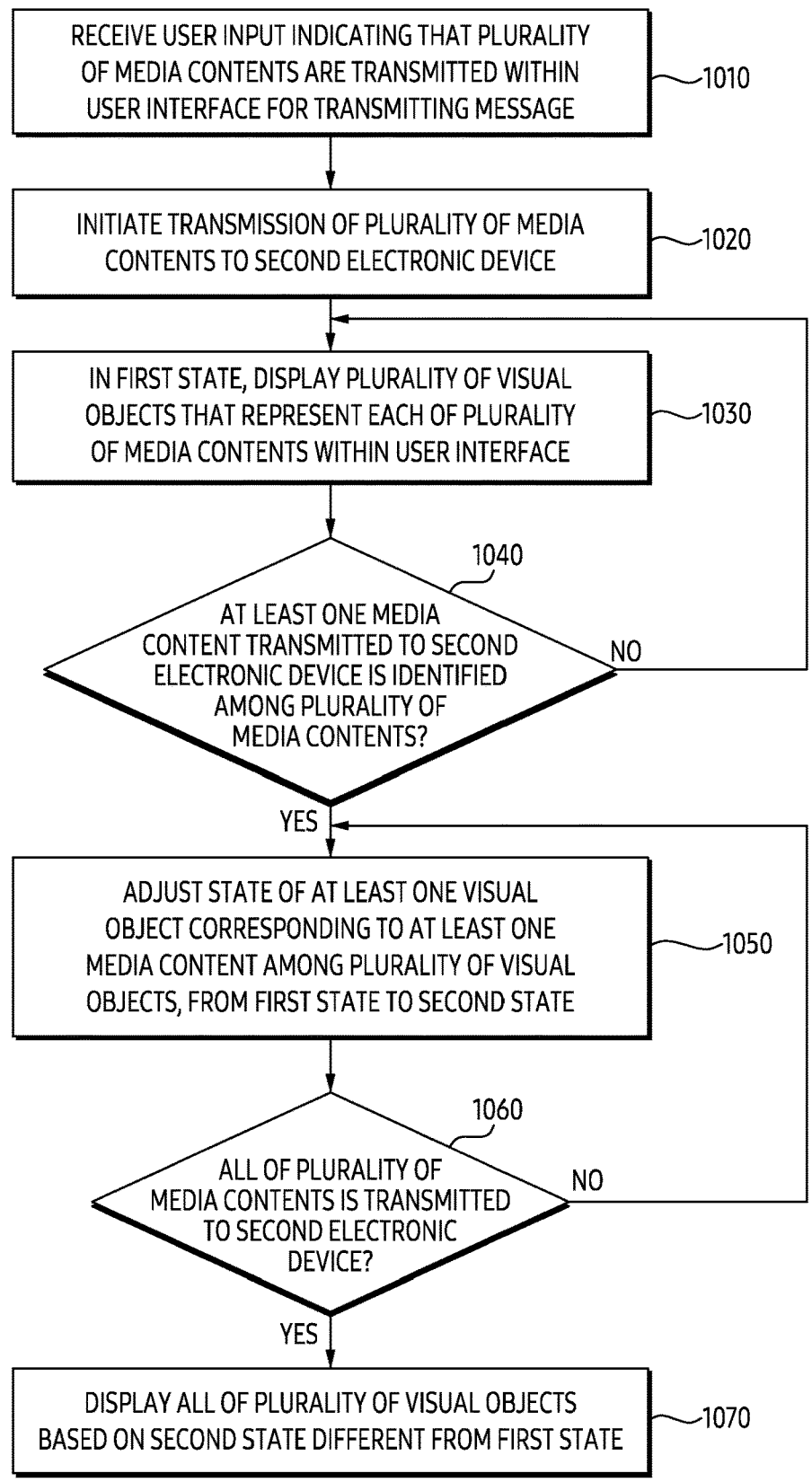
FIG. 10 illustrates an example of a flowchart illustrating operations for transmitting a plurality of media contents by a first electronic device, according to an embodiment.

FIG. 10 illustrates an example of a flowchart illustrating operations for transmitting a plurality of media contents by a first electronic device, according to an embodiment. The first electronic device of FIG. 10 may include the first electronic device 210 of FIG. 2 and/or FIG. 9. The operation of FIG. 10 may be related to at least one of the operations 910, 920, and 930 of FIG. 9.

Referring to FIG. 10, in operation 1010 according to an embodiment, the first electronic device may receive a user input indicating that a plurality of media contents are transmitted within a user interface for transmitting a message. Similar to operation 910 of FIG. 9, the first electronic device may perform operation 1010.

In operation 1020 of FIG. 10, according to an embodiment, in response to the user input of operation 1010, the first electronic device may initiate transmission of the plurality of media contents to the second electronic device. The second electronic device may include the second electronic device 220 of FIG. 2 and/or FIG. 9. The media contents may be specified by a user input in operation 1010 and/or another user input prior to the user input.

Referring to FIG. 10, in operation 1030, according to an embodiment, the first electronic device may display a plurality of visual objects that represent each of a plurality of media contents within the user interface in a first state. For example, the user interface may include a screen (e.g., screen 330 of FIG. 3) displayed based on a messenger application. For example, the first state may include a state in which a tone is adjusted based on gray and/or black. For example, the first state may indicate that media content corresponding to the visual object displayed within the first state is transmitted from the first electronic device.

Referring to FIG. 10, in operation 1040, according to an embodiment, the first electronic device may identify whether at least one media content transmitted to the second electronic device is identified among a plurality of media contents. Before identifying at least one media content transmitted to the second electronic device (1040-NO), the first electronic device may display all of a plurality of visual objects within the first state based on operation 1030.

When at least one media content transmitted to the second electronic device is identified (1040-YES), in operation 1050 of FIG. 10, the first electronic device according to an embodiment may adjust the state of at least one visual object corresponding to at least one identified media content among a plurality of visual objects from the first state to the second state. For example, the second state may be different from the first state, and may include a state in which media content corresponding to a visual object displayed within the second state is displayed independently of any visual effect, such as tone adjustment.

Referring to FIG. 10, in operation 1060, according to an embodiment, the first electronic device may identify whether all of a plurality of media contents is transmitted to the second electronic device. Before all of the plurality of media contents are transmitted to the second electronic device (1060-NO), the first electronic device may display each of a plurality of visual objects based on any one of a first state or a second state, based on operation 1050. While performing operations 1050 and 1060, the first electronic device may display the screens 330 of FIGS. 3 to 4.

When all of the plurality of media contents are transmitted to the second electronic device (1060-YES), in operation 1070 of FIG. 10, the first electronic device according to an embodiment may display all of a plurality of visual objects based on the second state different from the first state. The screen 420 of FIG. 4 may be an example of a screen on which the first electronic device displays all of a plurality of visual objects based on the second state. Operation 1070 may be performed, in response to completion of transmission of a plurality of media contents initiated based on operation 1020.

As described above, according to an embodiment, the first electronic device may individually display whether transmission of each of the plurality of media contents is completed, while transmitting a plurality of media contents based on the messenger application. Since the first electronic device individually displays to the user whether transmission of each of the plurality of media contents has been completed, the user experience related to transmission of the plurality of media contents may be improved.

Hereinafter, referring to FIG. 11, an operation of the second electronic device receiving a plurality of media contents from the first electronic device will be described.

Figure 11:
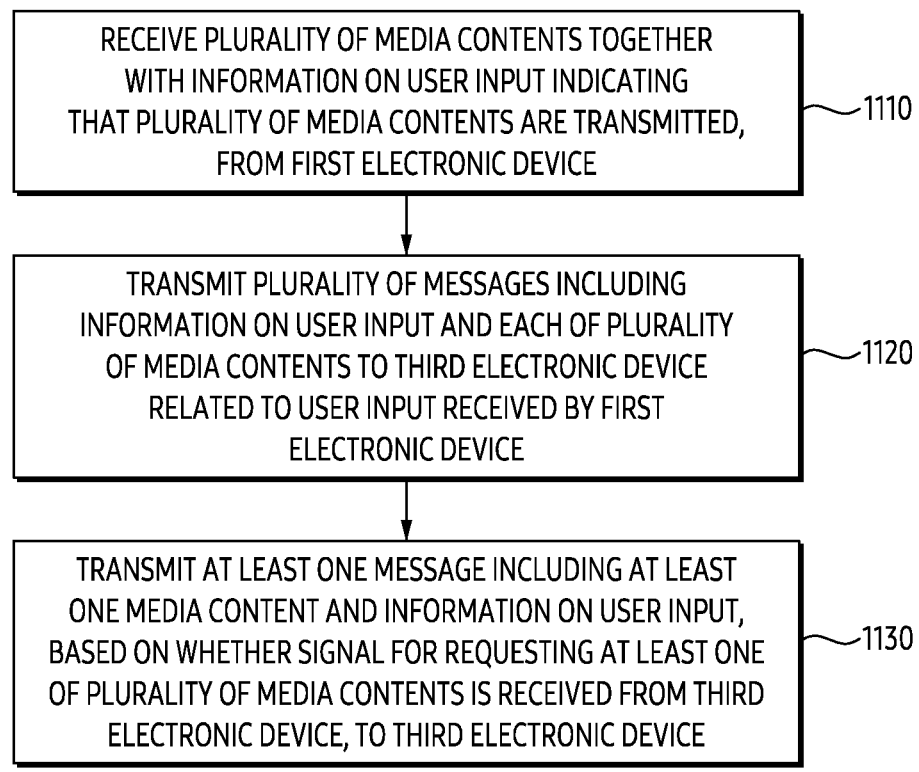
FIG. 11 illustrates an example of a flowchart illustrating operations for transmitting a plurality of media contents by a second electronic device according to an embodiment.

FIG. 11 illustrates an example of a flowchart illustrating operations for transmitting a plurality of media contents by a second electronic device according to an embodiment. The second electronic device of FIG. 11 may include the second electronic device 220 of FIG. 2 and/or FIG. 9. The operations of FIG. 11 may be related to the operations 920, 930, and 940.

Referring to FIG. 11, in operation 1110, according to an embodiment, the second electronic device may receive a plurality of media contents together with information on a user input indicating that a plurality of media contents are transmitted, from the first electronic device. The second electronic device may perform operation 1110 similarly to operation 930 of FIG. 9. For example, the second electronic device may receive the plurality of media contents together with the information for transmitting the plurality of media contents in a group.

Referring to FIG. 11, in operation 1120, according to an embodiment, the second electronic device may transmit a plurality of messages including information on a user input and each of the plurality of media contents to the third electronic device related to the user input received by the first electronic device. The plurality of messages may include a plurality of messages 955 of FIG. 9. The plurality of messages may include information on the user input in common. The plurality of messages may include the information for displaying media content included in each of the plurality of messages as a group.

Referring to FIG. 11, in operation 1130, according to an embodiment, the second electronic device may transmit at least one message including at least one media content and information on a user input based on whether a signal for requesting at least one of a plurality of media contents is received from the third electronic device, to the third electronic device. For example, transmitting the signal for requesting at least one of a plurality of media contents by the third electronic device may be performed, in response to an input indicating that visual object 712 of FIG. 7 is selected. Based on the at least one message, the third electronic device may additionally display at least one media content. Based on the time interval formed by the information on the user input, the third electronic device may display at least one media content in at least one message of operation 1130 in a bubble for indicating a group of the plurality of media contents, or using a bubble different from the bubble.

Hereinafter, referring to FIG. 12, an operation of the third electronic device receiving a plurality of messages of operation 1120 will be described.

Figure 12:
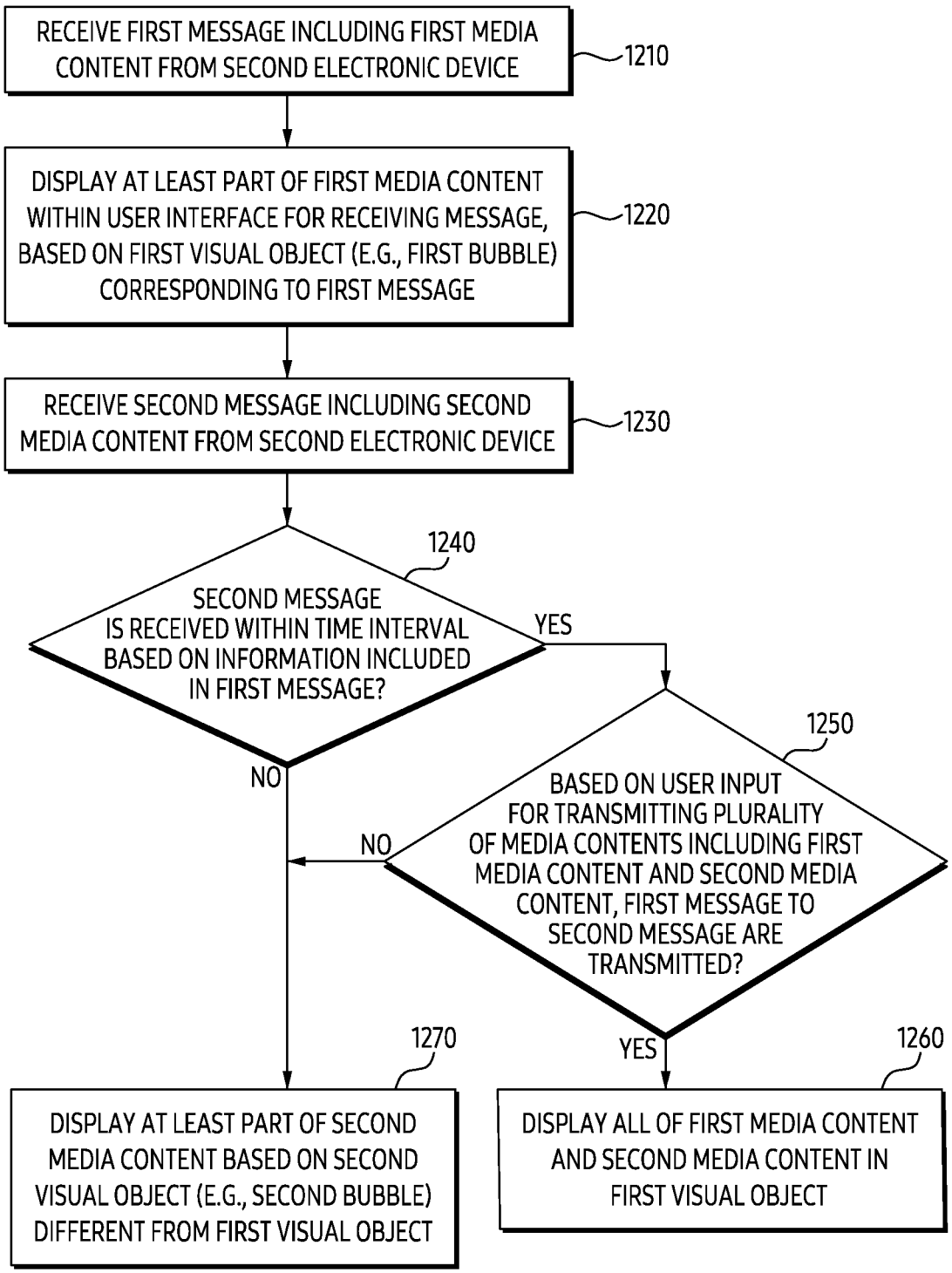
FIG. 12 illustrates an example of a flowchart illustrating operations for receiving a plurality of media contents by a third electronic device according to an embodiment.

FIG. 12 illustrates an example of a flowchart illustrating operations for receiving a plurality of media contents by a third electronic device according to an embodiment. The third electronic device of FIG. 12 may include the third electronic device 230 of FIG. 2 and/or FIG. 9. The operations of FIG. 12 may be related to the operations 960 and 970 of FIG. 9.

Referring to FIG. 12, in operation 1210, according to an embodiment, the third electronic device may receive a first message including a first media content from the second electronic device. The second electronic device may include the second electronic device 220 of FIG. 2 and/or FIG. 9. The first message may include information indicating a moment at which the first electronic device (e.g., the first electronic device 210 of FIG. 2 and/or FIG. 9) receives a user input indicating that the first media content is transmitted. When the first message is any one of a plurality of messages for transmitting a group of media contents including the first media content, the first message may include information indicating the group (e.g., numbers of the plurality of media contents included in the group). For example, the third electronic device may obtain at least one of a file name of the first media content, information indicating the moment, or information indicating the group from the data, by decoding the data included in the first message.

Referring to FIG. 12, in operation 1220, according to an embodiment, the third electronic device may display at least a part of the first media content within a user interface for receiving a message, based on the first visual object (e.g., the first bubble) corresponding to the first message. For example, the third electronic device may reduce and display the first media content in the first bubble. When the first media content is an image, the third electronic device may reduce and display the first media content in the first bubble. When the first media content is a video, the third electronic device may reduce and display one frame of the video in the first bubble. The first media content reduced and displayed in the first bubble may be referred to as a thumbnail.

Referring to FIG. 12, in operation 1230, according to an embodiment, the third electronic device may receive a second message including the second media content from the second electronic device. The second message may include information indicating a moment at which the first electronic device receives a user input indicating transmission of the second media content. For example, the third electronic device may obtain at least one of a file name of the second media content, information indicating the moment, or information indicating the group from the data, similar to operation 1210, by decoding the data contained in the second message. When the second media content and the first media content are included in the same group, the moment included in the second message may match the moment included in the first message of operation 1210.

In operation 1240 of FIG. 12, according to an embodiment, based on the reception of the second message, the third electronic device may determine whether the second message is received within a time interval based on information included in the first message. The time interval may include the guard time of FIG. 7. For example, based on the moment identified from the first message and the number of groups of the plurality of media contents, the third electronic device may identify the time interval.

When the second message is received within the time interval of operation 1240 (1240-YES), in operation 1250 of FIG. 12, according to an embodiment, the third electronic device may determine whether the first message to the second message are transmitted, based on a user input for transmitting a plurality of media contents including the first media content and the second media content. For example, the third electronic device may obtain a first moment identifying a user input indicating that the first electronic device transmits the first media content from the first message in operation 1210. The third electronic device may obtain a second moment identifying a user input indicating that the first electronic device transmits the second media content from the second message in operation 1230. When the first moment and the second moment are matched, the third electronic device may determine that the first to second messages are transmitted based on a user input for transmitting a plurality of media contents including the first media content and the second media content.

When the first to second messages are transmitted based on a user input for transmitting the plurality of media contents including the first media content and the second media content (1250-YES), in operation 1260 of FIG. 12, according to an embodiment, the third electronic device may display all of the first media content and the second media content in the first visual object. Based on operation 1260, the third electronic device may display a plurality of media contents in one bubble.

When the first to second messages are not transmitted based on one user input for transmitting the plurality of media contents including the first media content and the second media content (1250-NO) or the second message is received within a moment different from the time interval of operation 1240 (1240-NO), in operation 1270 of FIG. 12, according to an embodiment, the third electronic device may display at least a part of the second media content based on a second visual object (e.g., a second bubble) different from the first visual object.

Referring to operations 1240, 1250, 1260, and 1270 of FIG. 12, when other messages are received within the time interval of operation 1240, other media contents included in other messages different from the first message and included in the same group as the first media content may be accumulated within the first visual object in operation 1220. When the other messages are received after the time interval, the other media contents may be displayed through a visual object different from the first visual object in operation 1220. For example, the screen 730 of FIG. 7 may be an example of a screen displayed by the third electronic device based on reception of operation 1220 of FIG. 12.

Hereinafter, referring to FIG. 13, according to an embodiment, an operation performed by the third electronic device based on a user input while receiving messages including media contents in a group will be described.

Figure 13:
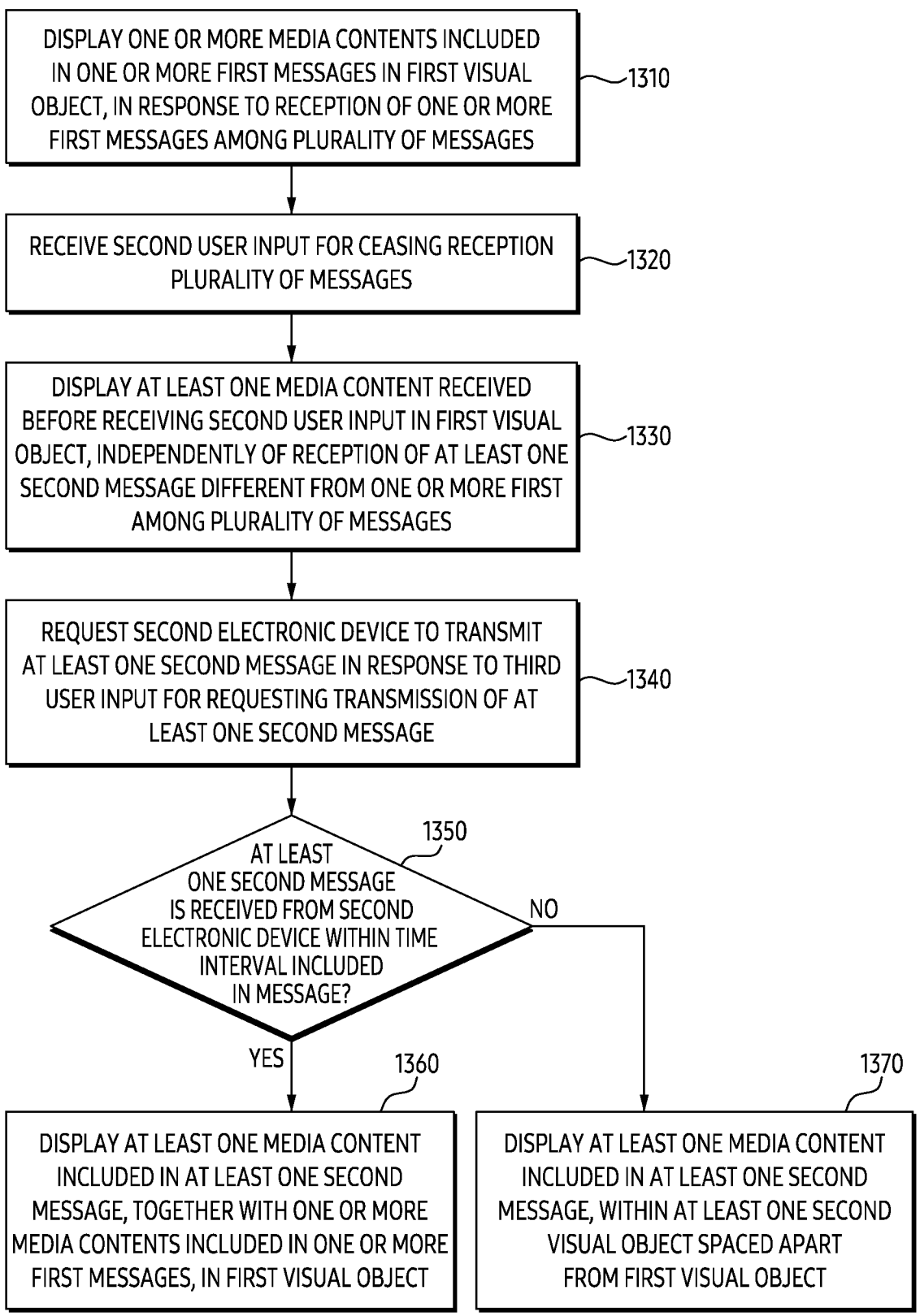
FIG. 13 illustrates an example of a flowchart illustrating operations performed by a third electronic device and for identifying whether media contents included in a plurality of messages are intensively displayed, according to an embodiment.

FIG. 13 illustrates an example of a flowchart illustrating operations performed by a third electronic device and for identifying whether media contents included in a plurality of messages are intensively displayed, according to an embodiment. The third electronic device of FIG. 13 may include the third electronic device 230 of FIG. 2 and/or FIG. 9.

Referring to FIG. 13, in operation 1310, according to an embodiment, the third electronic device may display one or more media contents included in one or more first messages in the first visual object in response to reception of one or more first messages among the plurality of messages. The plurality of messages may be grouped by a first user input (e.g., user input indicating that visual object 321 in FIG. 3 is selected) received by the first electronic device. The screens 610 and 620 of FIG. 6 may be an example of a screen displayed by the third electronic device based on the execution of operation 1310.

Referring to FIG. 13, in operation 1320, according to an embodiment, the third electronic device may receive a second user input for ceasing a reception a plurality of messages. The second user input may include an input indicating that a visual object is selected to notify the progress of reception of the plurality of media contents based on the plurality of messages, such as visual object 612.

In response to the second user input, in operation 1330 of FIG. 13, according to an embodiment, the third electronic device may display at least one media content received before receiving the second user input in the first visual object, independently of reception of at least one second message different from one or more first messages among a plurality of messages. Based on operation 1330, the third electronic device may maintain the display of at least one media content received before identifying the second user input in operation 1320. In response to the second user input, the third electronic device may refrain from displaying media content included in another message, based on the reception of the other message after the second user input. Based on operation 1330, the third electronic device may notify that the reception of the media content is ceased, as shown in the screen 720 of FIG. 7.

Referring to FIG. 13, in operation 1340, according to an embodiment, the third electronic device may request the second electronic device to transmit at least one second message in response to a third user input for requesting transmission of at least one second message. The third user input may include an input indicating that transmission of media content is resumed, such as an input for the visual object 712 in FIG. 7. The second electronic device may include the second electronic device 220 of FIG. 2 and/or FIG. 9.

Referring to FIG. 13, in operation 1350, according to an embodiment, the third electronic device may identify whether at least one second message is received from the second electronic device within a time interval included in the message. The time interval may be formed based on a moment in which the first electronic device receives a first user input. The time interval of operation 1350 may include the guard time of FIG. 7.

When the at least one second message is received within the time interval of operation 1350 (1350-YES), in operation 1360 of FIG. 13, according to an embodiment, the third electronic device may display at least one media content included in at least one second message in the first visual object, together with one or more media contents included in one or more first messages. When the at least one second message is received within a moment different from the time interval of operation 1350 (1350-NO), in operation 1370 of FIG. 13, according to an embodiment, the third electronic device may display at least one media content included in at least one second message, within at least one second visual object spaced apart from the first visual object. Based on the time interval of operation 1350, according to an embodiment, the third electronic device may control accumulation of a plurality of media contents included in the plurality of messages in a single bubble based on the plurality of messages.

As described above, according to an embodiment, electronic devices interconnected by the messenger service may execute a function related to displaying intensively a plurality of media contents within a single bubble. The function may include a function of visualizing the progress of transmission or reception of the plurality of media contents. The function may include a function of ceasing or resuming transmission or reception of the plurality of media contents. The function may include a function of sharing a reaction to each of the plurality of media contents of one of the users in which a plurality of media contents are shared with another user.

When an electronic device transmits and/or receives a plurality of media contents including a video and/or an image, a method for intensively displaying the plurality of media contents may be required. A method for individually controlling the transmission of a plurality of media contents while an electronic device intensively displays the plurality of media contents to be transmitted to an external electronic device may be required. A method for an electronic device to intensively display a plurality of media contents included in different messages may be required.

As described above, according to an embodiment, an electronic device (e.g., the first electronic device 210 of FIG. 2) may comprise a communication circuit, a display, and a processor. The processor may be configured to receive, in a user interface for transmitting a message that is displayed in the display, a user input indicating transmitting a plurality of media contents including a first media content to an external electronic device (e.g., the second electronic device 220 and/or the third electronic device 230 of FIG. 2). The processor may be configured to transmit, in response to the user input, the plurality of media contents to the external electronic device by using the communication circuit. The processor may be configured to display a plurality of visual objects respectively represent the plurality of media contents. The processor may be configured to display, before transmitting the first media content to the external electronic device, a first visual object among the plurality of visual objects representing the first media content in a first state where a tone (or visual aspect) of the first visual object is adjusted. The processor may be configured to change, after transmitting the first media content to the external electronic device, a state of the first visual object from the first state to a second state different from the first state.

According to an embodiment, when transmitting and/or receiving a plurality of media contents including a video and/or an image, an electronic device can intensively display the plurality of media contents. According to an embodiment, an electronic device can individually control transmission of a plurality of media contents while intensively representing the plurality of media contents to be transmitted to an external electronic device. According to an embodiment, an electronic device can intensively display a plurality of media contents included in different messages.

For example, the processor may be configured to obtain, in response to the user input, information indicating a moment receiving the user input. For example, the processor may be configured to transmit, to the external electronic device by using the communication circuit, a plurality of messages respectively including the plurality of media contents, and the obtained information.

For example, the processor may be configured to add, in the plurality of messages, another information indicating a number of the plurality of media contents.

For example, the processor may be configured to obtain, by encoding each name of files corresponding to the plurality of media contents based on the information and the other information, data to be included in the plurality of messages.

For example, the processor may be configured to add the information to each of the plurality of messages, to display the plurality of media contents in a bubble in the user interface displayed by another external electronic device different from the external electronic device.

For example, the processor may be configured to display, based on whether the second media content is transmitted to the external electronic device independent from whether the first media content is transmitted to the external electronic device, the second visual object representing the second media content based on one state of the first state or the second state.

For example, the processor may be configured to receive, from the external electronic device after the first media content is transmitted to the external electronic device, a signal indicating a reaction of a user regarding the first media content among the plurality of media contents. The processor may be configured to display another visual object representing the reaction in the first visual object displayed in the user interface by overlapping, in response to the signal.

For example, the user input may be a first user input. The processor may be configured to display, in the user interface while transmitting the plurality of media contents to the external electronic device, another visual object for controlling transmission of the plurality of media contents different from the plurality of visual object and a bubble where the plurality of media contents are included. The processor may be configured to cease at least temporary, in response to a second user input indicating selecting the other visual object, transmitting the plurality of media contents to the external electronic device.

For example, the processor may be configured to change, after transmission of the plurality of media contents to the external electronic device ceases, a representation of the other visual object to receive a third user input for resuming transmission of the plurality of media contents.

For example, the processor may be configured to terminate, in response to another user input regarding the first visual object in the first state, transmission of the first media content to the external electronic device.

For example, the processor may be configured to display, in the first state, the first visual object dimmed or faded according to a preset color based on adjustment of the visual aspect, where the visual aspect includes at least one of a tone or an alpha value.

As described above, according to an embodiment, a non-transitory computer-readable medium storing one or more programs, the one or more programs may be configured to, when executed by a processor of an electronic device (e.g., the second electronic device 220 of FIG. 2), cause the electronic device to receive, from a first external electronic device (e.g., the first electronic device 210 of FIG. 2), a plurality of media contents with information regarding a user input indicating transmitting the plurality of media contents. The one or more programs may be configured to cause the electronic device to transmit, to a second external electronic device (e.g., the third electronic device 230 of FIG. 2) based on receiving the plurality of media contents, a plurality of messages respectively including the information, another information indicating a number of the plurality of media contents, and the plurality of media contents.

For example, the one or more programs may be configured to, when executed by the processor of the electronic device, cause the electronic device to receive, from the first external electronic device, the information indicating a moment when a visual object for transmitting the plurality of media contents is selected by the user input, and the visual object may be displayed in a user interface for transmitting a message and is displayed in a display of the first external electronic device.

For example, the one or more programs may be configured to, when executed by the processor of the electronic device, cause the electronic device to transmit, to the second external electronic device, the plurality of messages including the information for displaying the plurality of media contents in a bubble.

For example, the one or more programs may be configured to, when executed by the processor of the electronic device, cause the electronic device to receive, from the second external electronic device after transmitting the plurality of messages, a signal notifying receiving of a user input requesting at least one media content among the plurality of media contents. The one or more programs may be configured to cause the electronic device to transmit, to the second external electronic device in response to the signal, at least one message including the at least one media content with the information, and the other information.

For example, the one or more programs may be configured to, when executed by the processor of the electronic device, cause the electronic device to receive, from the second external electronic device after transmitting at least one of the plurality of messages, a signal indicating a reaction regarding at least one media content among the plurality of media contents. The one or more programs may be configured to cause the electronic device to transmit, to the external electronic device in response to the signal, another signal for displaying a visual object indicating the reaction by overlapping on the at least one media content.

For example, the one or more programs may be configured to, when executed by the processor of the electronic device, cause the electronic device to transmit, to the first external electronic device based on receiving a first media content among the plurality of media contents from the first external electronic device, a signal for changing a state of the visual object displayed in the first external electronic device and representing the first media content, from a first state where at least one of a tone or alpha value is adjusted, to a second state different from the first state.

As described above, according to an embodiment, a method of an electronic device (e.g., the third electronic device 230 of FIG. 2) may comprise receiving (e.g., operation 1210 in FIG. 12) a first message including a first media content, from an external electronic device (e.g., the second electronic device 220 and/or the first electronic device 210 in FIG. 2) by using a communication circuit of the electronic device. The method of the electronic device may comprise displaying (e.g., operation 1220 of FIG. 12) a visual object, based on the first message, for representing the first media content included in the first message, in a user interface associated with the first message and displayed in a display of the electronic device. The method of the electronic device may comprise identifying (e.g., operation 1230 of FIG. 12), based on receiving a second message including a second media content from the external electronic device, whether the second message includes information for displaying the second media content with the first media content. The method of the electronic device may comprise displaying (e.g., operation 1260 of FIG. 12), based on identifying the information included in the second message, the second media content with the first media content within the visual object.

For example, the method of the electronic device may comprise displaying (e.g., operation 1270 of FIG. 12), in the user interface in a state different from another state identifying the information from the second message, the second media content by using another visual object separated from the visual object.

For example, the method of the electronic device may comprise identifying (e.g., operation 1250 of FIG. 12) whether a timestamp extracted from the second message is equal to a moment when a user input, which is identified from the first message, for transmitting the first media content is received.

For example, the identifying may include an operation of identifying whether the second message includes the information indicating that the second message is transmitted based on a user input for transmitting the first media content.

For example, the operation of displaying the visual object for representing the first media content may include an operation of displaying another visual object notifying the reception of the plurality of media contents, together with the visual object, based on identifying another information indicating the number of a plurality of media contents including the first media content from the first message.

For example, the operation of displaying the other visual object may include an operation of displaying the other visual object for a duration based on at least one of for a duration based on at least one of a moment which is identified from the first message and receives a user input for transmitting the plurality of media contents, or the number of the plurality of media contents.

For example, the visual object may be a first visual object, and the other visual object may be a second visual object. The operation of displaying the second media content may include displaying the second media content in the second message based on a third visual object in the user interface, independently of whether the second message includes the information, based on receiving the second message after the expiration of the period.

For example, after receiving another user input indicating that the other visual object is selected, an operation of ceasing adding other media contents different from the first media content from among the plurality of media contents to the visual object may be included.

For example, the operation of displaying the second media content together with the first media content may include an operation of identifying a reaction regarding one media content from among the first media content or the second media content, based on the visual object. In response to identifying the reaction, the operation of displaying the second media content together with the first media content may include transmitting a signal indicating the reaction to the external electronic device.

As described above, according to an embodiment, a method of an electronic device (e.g., the first electronic device 210 in FIG. 2) may comprise receiving (e.g., operation 1010 of FIG. 10), in a user interface for transmitting a message that is displayed in the display, a user input indicating transmitting a plurality of media contents including a first media content to an external electronic device. The method of the electronic device may comprise transmitting (e.g., operation 1020 of FIG. 10), in response to the user input, the plurality of media contents to the external electronic device by using the communication circuit, and displaying a plurality of visual objects respectively represent the plurality of media contents. The method of the electronic device may comprise displaying (e.g., operation 1030 of FIG. 10), before transmitting the first media content to the external electronic device, a first visual object among the plurality of visual objects representing the first media content in a first state where a tone of the first visual object is adjusted. The method of the electronic device may comprise changing (e.g., operation 1050 of FIG. 10), after transmitting the first media content to the external electronic device, a state of the first visual object from the first state to a second state different from the first state.

For example, the operation of displaying the plurality of visual objects may comprise obtaining, in response to the user input, information indicating a moment receiving the user input. The method of the electronic device may comprise transmitting, to the external electronic device by using the communication circuit, a plurality of messages respectively including the plurality of media contents, and the obtained information.

For example, an operation of transmitting the plurality of messages to the external electronic device may comprise adding, in the plurality of messages, another information indicating numbers of the plurality of media contents.

For example, the method of the electronic device may comprise obtaining, by encoding each of names of files corresponding to the plurality of media contents based on the information and the other information, data to be included in the plurality of messages.

For example, an operation of transmitting the plurality of messages to the external electronic device may comprise adding the information to each of the plurality of messages, to display the plurality of media contents in a bubble in the user interface displayed by another external electronic device different from the external electronic device.

For example, an operation of displaying the plurality of visual objects may comprise displaying, based on whether a second media content is transmitted to the external electronic device independent from whether the first media content is transmitted to the external electronic device, a second visual object representing the second media content based on one state of the first state or the second state.

For example, the method of the electronic device may comprise receiving, from the external electronic device after the first media content is transmitted to the external electronic device, a signal indicating reaction of a user regarding the first media content among the plurality of media contents. The method of the electronic device may comprise displaying, another visual object representing the reaction, in response to the signal, in the first visual object displayed in the user interface, by overlapping.

For example, the user input may be a first user input. An operation of displaying the plurality of visual objects may comprise displaying, in the user interface while transmitting the plurality of media contents to the external electronic device, another visual object for controlling transmission of the plurality of media contents different from the plurality of visual object and a bubble where the plurality of media contents are included. An operation of displaying the plurality of visual objects may comprise ceasing at least temporary, in response to a second user input indicating selecting the other visual object, transmitting the plurality of media contents to the external electronic device.

For example, the method of the electronic device may comprise changing, after transmission of the plurality of media contents to the external electronic device ceases, representation of the other visual object to receive a third user input for resuming transmission of the plurality of media contents.

For example, an operation of displaying the first visual object within the first state may comprise terminating, in response to another user input regarding the first visual object in the first state, transmission of the first media content to the external electronic device.

For example, an operation of displaying the first visual object within the first state may comprise displaying, in the first state, the first visual object dimmed or faded according to a preset color based on adjustment of the visual aspect includes at least one of a tone or an alpha value.

According to an embodiment, a method of an electronic device (e.g., the second electronic device 220 of FIG. 2) may comprise receiving (e.g., operation 1110 of FIG. 11), from a first external electronic device (e.g., the first electronic device 210 of FIG. 2), a plurality of media contents with information regarding a user input indicating transmitting the plurality of media contents. The method of the electronic device may comprise transmitting (e.g., operation 1120 of FIG. 11), to a second external electronic device based on receiving the plurality of media contents, a plurality of messages respectively including the information, another information indicating the number of the plurality of media contents, and the plurality of media contents.

For example, the operation of receiving the plurality of media contents may include transmitting a signal to change a state of a visual object displayed in the first external electronic device and representing the first media content from a first state in which at least one of a tone or an alpha value is adjusted to a second state different from the first state, to the first external electronic device, based on receiving the first media content among the plurality of media contents from the first external electronic device.

For example, the operation of transmitting the plurality of messages may include transmitting the plurality of messages including the information for displaying the plurality of media contents within a bubble to the second external electronic device.

As described above, an electronic device (e.g., the third electronic device 230 of FIG. 2) according to an embodiment may comprise a communication circuit, a display, and a processor. The processor may be configured to receive a first message including a first media content, from an external electronic device (e.g., the second electronic device 220 and/or the first electronic device 210 in FIG. 2) by using a communication circuit of the electronic device. The processor may be configured to display a visual object, based on the first message, for representing the first media content included in the first message, in a user interface associated with the first message and displayed in a display of the electronic device. The processor may be configured to identify, based on receiving a second message including a second media content from the external electronic device, whether the second message includes information for displaying the second media content with the first media content. The processor may be configured to display, based on identifying the information included in the second message, the second media content with the first media content within the visual object.

For example, in a different state than the state in which the information is identified from the second message, the processor may be configured to display the second media content in the user interface by using another visual object spaced apart from the visual object.

For example, the processor may be configured to identify whether a timestamp extracted from the second message is identified from the first message and matches the moment that received the user input for transmitting the first media content.

For example, based on identifying other information indicating the number of the plurality of media contents including the first media content from the first message, the processor may be configured to display another visual object notifying the reception of the plurality of media contents together with the visual object.

For example, the processor may be configured to display the other visual object for a period based on at least one of moment identified from the first message and received a user input for transmitting the plurality of media contents, or the number of the plurality of media contents.

According to an embodiment, a non-transitory computer-readable medium storing one or more programs, the one or more programs may be configured to, when executed by a processor of an electronic device, cause the electronic device to receive, in a user interface for transmitting a message that is displayed in the display, a user input indicating transmitting a plurality of media contents including a first media content to an external electronic device. The one or more programs may be configured to cause the electronic device to transmit, in response to the user input, the plurality of media contents to the external electronic device by using the communication circuit, and display a plurality of visual objects respectively represent the plurality of media contents. The one or more programs may be configured to cause the electronic device to display, before transmitting the first media content to the external electronic device, a first visual object among the plurality of visual objects representing the first media content in a first state where a tone of the first visual object is adjusted. The one or more programs may be configured to cause the electronic device to change, after transmitting the first media content to the external electronic device, a state of the first visual object from the first state to a second state different from the first state.

According to an embodiment, an electronic device may comprise a communication circuit and a processor. The processor may be configured to receive, from a first external electronic device through the communication circuit, a plurality of media contents with information regarding a user input indicating transmitting the plurality of media contents. The processor may be configured to transmit, to a second external electronic device through the communication circuit based on receiving the plurality of media contents, a plurality of messages respectively including the information, another information indicating the number of the plurality of media contents, and the plurality of media contents.

According to an embodiment, a non-transitory computer-readable medium storing one or more programs, the one or more programs may be configured to, when executed by a processor of an electronic device, cause the electronic device to receive a first message including a first media content, from an external electronic device by using a communication circuit of the electronic device. The one or more programs may be configured to cause the electronic device to display a visual object, based on the first message, for representing the first media content included in the first message, in a user interface associated with the first message and displayed in a display of the electronic device. The one or more programs may be configured to cause the electronic device to identify, based on receiving a second message including a second media content from the external electronic device, whether the second message includes information for displaying the second media content with the first media content. The one or more programs may be configured to cause the electronic device to display, based on identifying the information included in the second message, the second media content with the first media content within the visual object.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:
1. An electronic device, comprising:
communication circuitry;
a display;
memory storing instructions, comprising one or more storage media; and
at least one processor comprising processing circuitry,
wherein the instructions, when executed by the at least one processor individually or collectively, cause the electronic device to:
display, through the display, a user interface (UI) of a messenger software application;
while the UI is displayed, receive, through the UI, a user input to transmit, through the communication circuitry, a plurality of media contents to an external electronic device using the messenger software application;

in response to the user input:
  transmit, through the communication circuitry, the plurality of media contents to the external electronic device; and
  display, through the display, in the UI, a bubble including a plurality of thumbnail images respectively representing the plurality of media contents, and
while the plurality of media contents are transmitted to the external electronic device, display, in the bubble, a thumbnail image, representing a media content completely transmitted to the external electronic device among the plurality of media contents, visually highlighted with respect to remaining thumbnail images.

2. The electronic device of claim 1, wherein the instructions, when executed by the at least one processor individually or collectively, cause the electronic device to:
  transmit a plurality of signals using the communication circuitry which are respectively include the plurality of media contents and are including a timestamp indicating a moment of receiving the user input.

3. The electronic device of claim 2, wherein the instructions, when executed by the at least one processor individually or collectively, cause the electronic device to:
  add, in the plurality of messages, another information indicating a number of the plurality of media contents.

4. The electronic device of claim 3, wherein the instructions, when executed by the at least one processor individually or collectively, cause the electronic device to:
  obtain, by encoding each name of files corresponding to the plurality of media contents based on the timestamp and the information, data to be included in the plurality of signals.

5. The electronic device of claim 2, wherein the instructions, when executed by the at least one processor individually or collectively, cause the electronic device to:
  add the information to each of the plurality of signals, to display the plurality of media contents in a bubble in another user interface displayed by the external electronic device.

6. The electronic device of claim 1, wherein the instructions, when executed by the at least one processor individually or collectively, cause the electronic device to:
  while transmitting the plurality of signals, identify a transmission status of each of the plurality of signals; and
  based on identifying that a transmission status associated with to a signal including the media content corresponds to a first preset status, display the thumbnail image to be visually highlighted with respect to the remaining thumbnail images.

7. The electronic device of claim 1, wherein the instructions, when executed by the at least one processor individually or collectively, cause the electronic device to:
  receive, from the external electronic device after the media content is completely transmitted to the external electronic device, a signal indicating a reaction of a user with respect to the media content among the plurality of media contents; and
  in response to the received signal, display, in the UL, a visual object representing the reaction superimposed on the thumbnail image.

8. The electronic device of claim 1, wherein the user input is a first user input, and wherein the instructions, when executed by the at least one processor individually or collectively, cause the electronic device to:
  while the plurality of media contents are transmitted to the external electronic device, display, visual object next to the bubble to control transmission of the plurality of media contents; and
  cease at least temporarily, in response to another user input indicating to select the other visual object, transmitting the plurality of media contents to the external electronic device.

9. The electronic device of claim 8, wherein the instructions, when executed by the at least one processor individually or collectively, cause the electronic device to:
  change, after transmission of the plurality of media contents to the external electronic device ceases, a representation of the other visual object to receive other user input indicating to resume transmission of the plurality of media contents.

10. The electronic device of claim 1, wherein the instructions, when executed by the at least one processor individually or collectively, cause the electronic device to:
  terminate, in response to another user input with respect to one of the remaining thumbnail images, transmission of a media content to the external electronic device which is associated with the other user input.

11. The electronic device of claim 1, wherein the instructions, when executed by the at least one processor individually or collectively, cause the electronic device to:
  display the remaining thumbnail images dimmed or faded according to a preset color with respect to the thumbnail image.

12. A non-transitory computer-readable medium storing one or more programs, wherein the one or more programs are configured to, when executed by an electronic device including communication circuitry and a display, cause the electronic device to:
  display, through the display, a user interface (UI) of a messenger software application;
  while the UI is displayed, receive, through the UI, a user input to transmit, through the communication circuitry, a plurality of media contents to an external electronic device using the messenger software application;
  in response to the user input:
    transmit, through the communication circuitry, the plurality of media contents to the external electronic device; and
    display, through the display, in the UI, a bubble including a plurality of thumbnail images respectively representing the plurality of media contents, and
  while the plurality of media contents are transmitted to the external electronic device, display, in the bubble, a thumbnail image, representing a media content completely transmitted to the external electronic device among the plurality of media contents, visually highlighted with respect to remaining thumbnail images.

13. The non-transitory computer-readable medium of claim 12, wherein the one or more programs are configured to, when executed by the electronic device, cause the electronic device to:
  transmit a plurality of signals using the communication circuitry which are respectively include the plurality of media contents and are including a timestamp indicating a moment of receiving the user input.

14. The non-transitory computer-readable medium of claim 12, wherein the one or more programs are configured to, when executed by the electronic device, cause the electronic device to:
  add, in the plurality of signals, information indicating a number of the plurality of media contents.

15. The non-transitory computer-readable medium of claim 12, wherein the one or more programs are configured to, when executed by the electronic device, cause the electronic device to:

obtain, by encoding each name of files corresponding to the plurality of media contents based on the timestamp and the information, data to be included in the plurality of signals.

16. The non-transitory computer-readable medium of claim 12, wherein the one or more programs are configured to, when executed by the electronic device, cause the electronic device to:

add the information to each of the plurality of signals, to display the plurality of media contents in a bubble in another user interface displayed by the external electronic device.

17. The non-transitory computer-readable medium of claim 12, wherein the one or more programs are configured to, when executed by the electronic device, cause the electronic device to:

while transmitting the plurality of signals, identify a transmission status of each of the plurality of signals; and based on identifying that a transmission status associated with to a signal including the media content corresponds to a first preset status, display the thumbnail image to be visually highlighted with respect to the remaining thumbnail images.

18. A method of an electronic device, comprising:

receiving a first signal including a first media content, from an external electronic device through communication circuitry of the electronic device;

based on the received first signal, displaying, in a user interface (UI) of a messenger software application, a bubble including a first thumbnail image representing the first media content;

receiving a second signal including a second media content from the external electronic device through the communication circuitry;

based on receiving the second signal including information indicating that the second media content is included in a group in which the first media content is included, display, within the bubble, a second thumbnail image representing the second media content; and based on receiving the second signal independent from the information, display, through another bubble positioned below the bubble, the second thumbnail image.

19. The method of claim 18, further comprising:

based on the information including a timestamp indicating a moment when the external electronic device receive a user input indicating to transmit a plurality of media contents including the first media content and the second media content, determining whether to display the second thumbnail image within the bubble.

20. The method of claim 19, further comprising:

when the second signal including the information is received after expiration of a guard time which was defined by the timestamp, display the second thumbnail image in the other bubble positioned below the bubble.

* * * * *